United States Patent
Singh et al.

(10) Patent No.: US 9,256,474 B2
(45) Date of Patent: Feb. 9, 2016

(54) AUTOMATICALLY ALIGNING VIRTUAL BLOCKS TO PHYSICAL BLOCKS

(71) Applicant: Tintri Inc., Mountain View, CA (US)

(72) Inventors: Pratap V. Singh, Mountain View, CA (US); Vyacheslav V. Malyugin, Los Gatos, CA (US); Mark G. Gritter, Eagan, MN (US); Edward K. Lee, Dublin, CA (US)

(73) Assignee: Tintri Inc., Mountain View, CA (US)

( * ) Notice: Subject to any disclaimer, the term of this patent is extended or adjusted under 35 U.S.C. 154(b) by 0 days.

(21) Appl. No.: 14/509,857

(22) Filed: Oct. 8, 2014

(65) Prior Publication Data

US 2015/0089182 A1      Mar. 26, 2015

Related U.S. Application Data

(63) Continuation of application No. 13/421,712, filed on Mar. 15, 2012, now Pat. No. 8,909,894.

(60) Provisional application No. 61/453,356, filed on Mar. 16, 2011.

(51) Int. Cl.
| | |
|---|---|
| G06F 12/00 | (2006.01) |
| G06F 9/50 | (2006.01) |
| G06F 13/12 | (2006.01) |
| G06F 12/02 | (2006.01) |
| G06F 12/06 | (2006.01) |
| G06F 12/08 | (2006.01) |
| G06F 13/00 | (2006.01) |
| G06F 11/00 | (2006.01) |

(52) U.S. Cl.
CPC .............. *G06F 9/5077* (2013.01); *G06F 11/00* (2013.01); *G06F 12/00* (2013.01); *G06F 12/02* (2013.01); *G06F 12/06* (2013.01); *G06F 12/0646* (2013.01); *G06F 12/0868* (2013.01); *G06F 12/0871* (2013.01); *G06F 13/00* (2013.01); *G06F 13/12* (2013.01); *G06F 13/122* (2013.01); *G06F 13/124* (2013.01)

(58) Field of Classification Search
None
See application file for complete search history.

(56) References Cited

U.S. PATENT DOCUMENTS

2012/0047110 A1 *   2/2012   Brunet et al. ................. 707/640

\* cited by examiner

*Primary Examiner* — Midys Rojas
(74) *Attorney, Agent, or Firm* — Van Pelt, Yi & James LLP

(57) ABSTRACT

Automatically aligning virtual blocks of partitions to blocks of underlying physical storage is disclosed. In some embodiments, a starting offset of a partition included in a logical container is detected. In some embodiments, a misalignment correction amount for a partition included in a logical container is detected. In some embodiments, a misalignment associated with a partition included in a logical container is corrected.

24 Claims, 20 Drawing Sheets

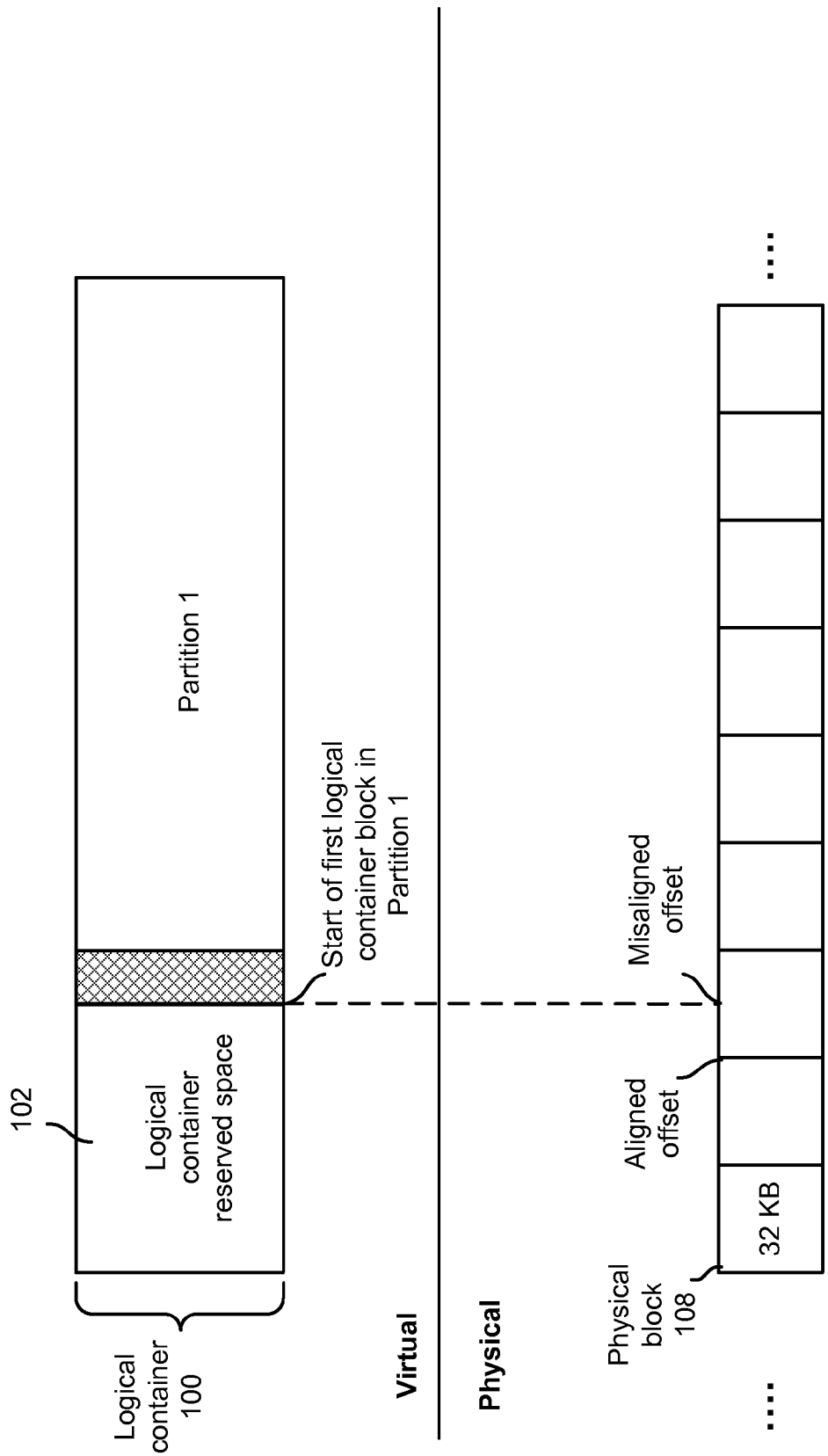

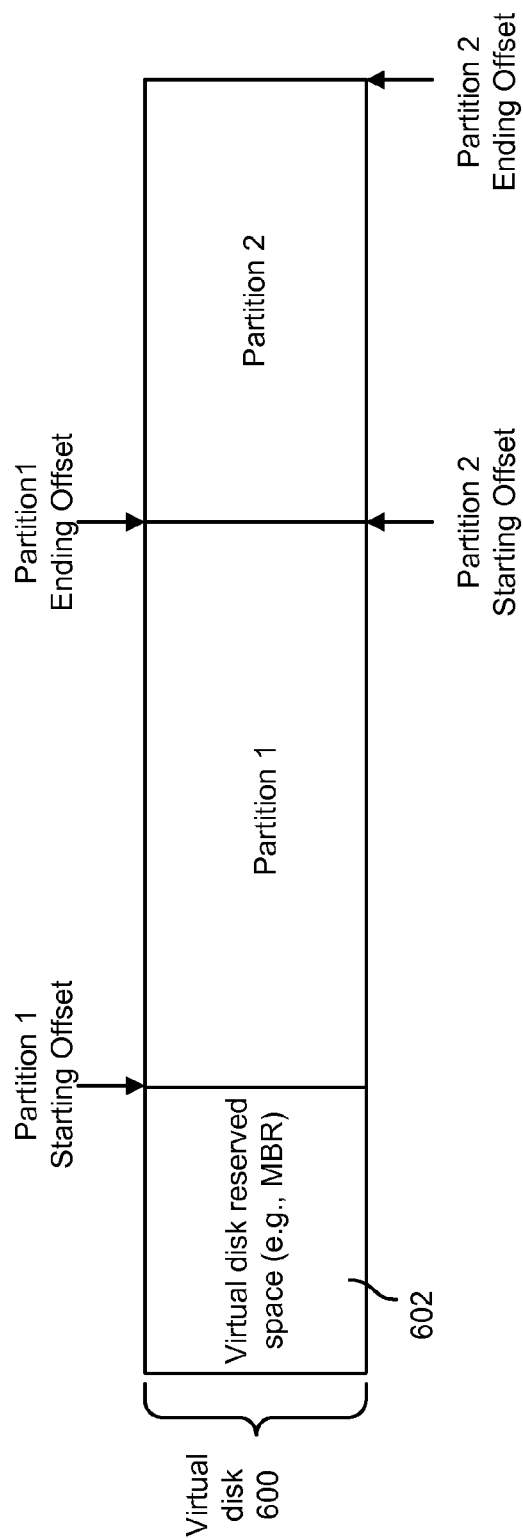

AUTOMATICALLY ALIGNING VIRTUAL BLOCKS TO PHYSICAL BLOCKS

CROSS REFERENCE TO OTHER APPLICATIONS

This application is a continuation of co-pending U.S. patent application Ser. No. 13/421,712, entitled AUTOMATICALLY ALIGNING VIRTUAL BLOCKS TO PHYSICAL BLOCKS filed Mar. 15, 2012 which is incorporated herein by reference for all purposes, which claims priority to U.S. Provisional Patent Application No. 61/453,356 entitled AUTOMATICALLY ALIGNING BLOCKS OF VIRTUAL DISKS FOR VMS filed Mar. 16, 2011 which is incorporated herein by reference for all purposes.

BACKGROUND OF THE INVENTION

In typical systems, a partition within a virtual disk can start at an offset that is not a multiple of the block size used by the physical underlying storage subsystem that stores the virtual disk. As a result, inefficiencies are created in accessing data stored on the storage subsystem. For example, a single block access at the virtualization level (e.g., the access is made to a virtual disk block of a virtual disk partition) may map to multiple physical blocks or straddle multiple physical blocks (e.g., instead of a single physical block) at the underlying storage subsystem. Accessing multiple physical blocks may require reading more data than is needed and discarding the unneeded data, which could be undesirable.

BRIEF DESCRIPTION OF THE DRAWINGS

Various embodiments of the invention are disclosed in the following detailed description and the accompanying drawings.

FIG. 1A is an example of a logical container and portions of an underlying physical storage subsystem to which data associated with the logical container is to be stored.

FIG. 6C is an example of a master boot record (MBR) data structure.

FIG. 6D is an example of a partition table extracted from the MBR from virtual disk 600.

DETAILED DESCRIPTION

Figure 1B:
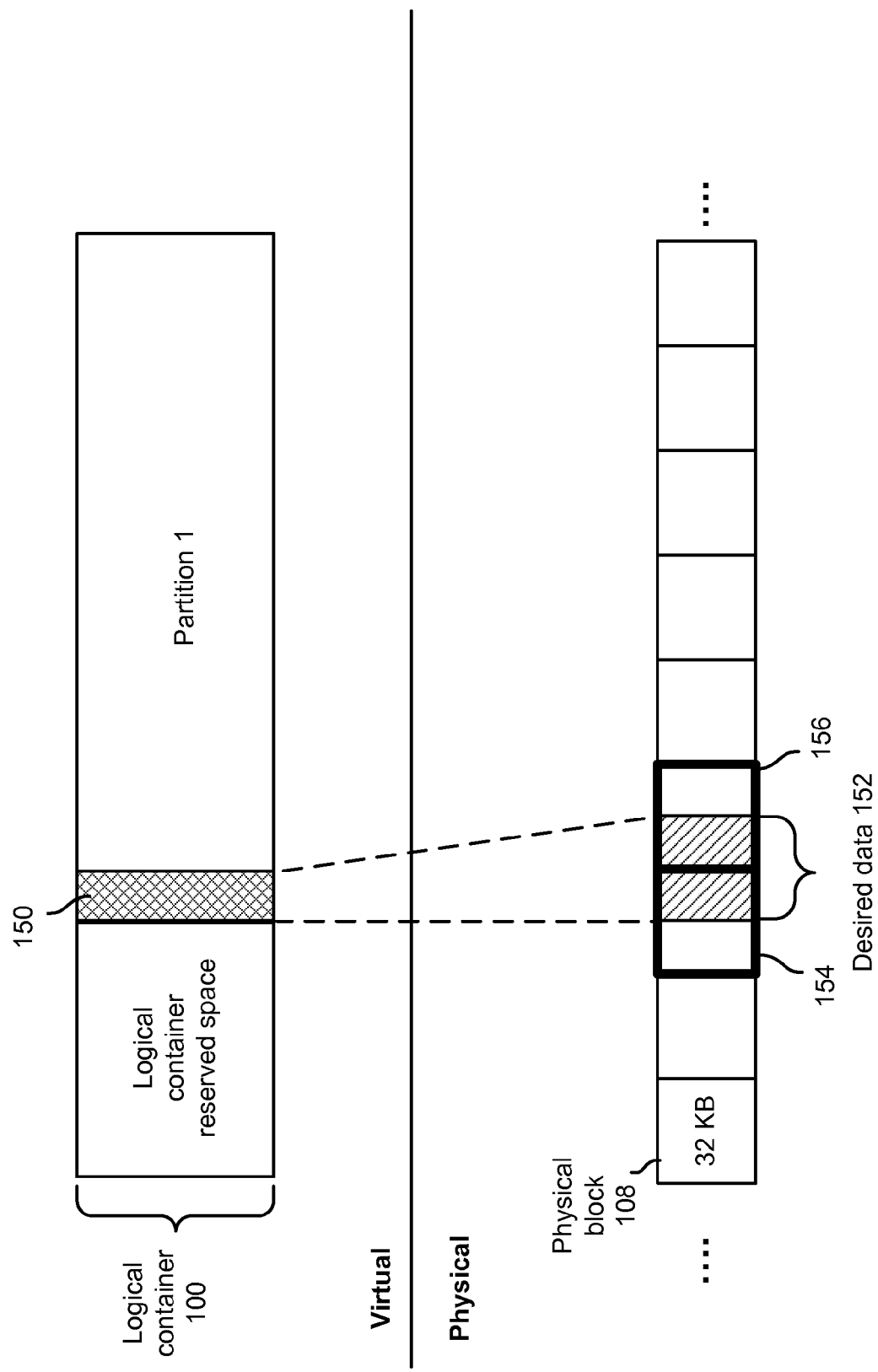
FIG. 1B is an example of accessing data associated with a misaligned partition of a logical container.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1A is an example of a logical container and portions of an underlying physical storage subsystem to which data associated with the logical container is to be stored.

A virtual machine (VM) environment models physical storage devices as logical containers (e.g., virtual disks). For example, virtual disks are physically hosted by a standard storage subsystem like network-attached storage (NAS) or storage area network (SAN). Virtual disks can be directly attached to the system hosting one or more VMs. Each VM may run a different operating system. As such, different operating systems may concurrently run and share the resources of the same physical machine. When a virtual disk is used by a guest operating system running on a VM, the virtual disk will "label" the disk and may also create one or more partitions on the disk in order to create a separate file system on each partition or use a partition for other purposes (e.g., for "swapping" or as raw disk volumes). One or more files may be used to store the contents of virtual disks. In some embodiments, a VM management infrastructure (i.e., a hypervisor) creates the files that store the contents of the virtual disks (e.g., the guest operating system, program files and data files) and the other data associated with the specific VM.

The storage of data of a logical container such as logical container 100 maps to a set of (contiguous or non-contiguous) physical blocks of the underlying storage subsystem. In the example, logical container 100 maps to at least some of the physical blocks of the underlying storage subsystem (i.e., the physical storage) shown in the example, including physical block 108. The physical blocks to which the data of logical container 100 are mapped and stored can be associated with one or more hardware devices. In the example, the underlying storage subsystem is represented by the series of physical blocks including physical block 108. The physical block is the lowest unit of data that can be accessed from the underlying storage subsystem. To perform a read or write request associated with a logical container such as a virtual disk, one or more physical blocks can be accessed. In the example, each physical block comprises 32 kilobytes (KB) of data. A logical container such as logical container 100 of the example generally has a portion of space that is reserved by the virtual disk ("logical container reserved space 102"). For example, at least a portion of logical container reserved space 102 can be used to store attributes about the logical container (e.g., a partition table), one or more partitions thereof, other data, and/or to leave blank. A logical container such as logical container 100 can also have a user-configurable number of partitions, each of a user-configurable size. Data associated with the partitions of logical container 100 (e.g., used by applications running on the VM) are stored in logical container blocks (i.e., logical container 100 in this example). The virtual disk blocks in turn correspond to block offsets associated with physical blocks at the underlying storage subsystem. In the example, logical container 100 has only one partition, Partition 1. As shown in the example, data associated with the first logical container block of Partition 1 is stored at a corresponding underlying offset at the underlying storage subsystem.

User data to be stored to logical container 100 are written to portions of the logical container 100 other than logical container reserved space 102, such as Partition 1. Typically, the data associated with logical container reserved space 102 is mapped to an offset associated with the starting of a physical block such as physical block 108 so the start of logical container 100 is aligned with the physical blocks of the underlying storage subsystem. For example, in the underlying storage subsystem, physical blocks such as physical block 108 begins at an underlying offset that is zero modulo the size of the unit of allocation of the storage subsystem (i.e., the physical block size). So, in various embodiments, when an underlying starting offset of a partition is a multiple of the size of each physical block, the partition located at that underlying starting offset is considered to be aligned. The following formula describes an aligned partition:

[Underlying starting offset of the partition] mod [physical block size]==0.

For instance, if a partition started at underlying physical starting offset 65,536 bytes and if the physical block size were 32,768 bytes, then the partition is aligned because 65,536 mod 32,768==0.

However, typically, because the conventional size of logical container reserved space 102 (e.g., a logical container reserved space sometimes comprises 63 sectors worth of data) is not usually a multiple of a size of a physical block (e.g., 8 KB, 32 KB, 64 KB) or due to some other reason, the underlying starting offset of a partition of a logical container (i.e., the logical container blocks of the partition) is not aligned with the physical blocks of the underlying storage subsystem. As shown in the example, the underlying offset of Partition 1 maps to an offset which is not at a boundary of a physical block and this offset is labeled as the "Misaligned offset." In various embodiments, when the underlying starting offset of a partition is misaligned relative to the physical blocks of the underlying storage subsystem, the partition is referred to as being misaligned. To contrast, the offset at the starting boundary offset of a physical block is labeled as an "Aligned offset." A possible consequence of the underlying offset of Partition 1 mapping to a misaligned offset is shown in the next figure, FIG. 1B.

FIG. 1B is an example of accessing data associated with a misaligned partition of a logical container. In the example, logical container block 150 starting at the underlying offset of Partition 1 is requested by a write operation. While logical container block 150 can be of the same or a different size from a physical block of the underlying storage subsystem, in this example, assume that logical container block 150 has the same size as each physical block of data (e.g., 32 KB). Because Partition 1 is misaligned relative to the physical blocks of the underlying storage subsystem, logical container block 150 maps to desired data 152 which includes portions of two physical blocks, physical blocks 154 and 156 (as opposed to only one physical block if Partition 1 were aligned). As a result, a "read-modify-write" operation would be applied to both physical blocks 154 and 156 rather than a simple write operation to a single physical block. The repeated use of "read-modify-write" operations when a more resourceful operation could be used slows down accesses to the storage subsystem overall.

Automatically aligning virtual blocks of partitions to blocks of underlying physical storage is disclosed. Boundaries of one or more partitions are first determined. In some embodiments, a "partition" refers to a portion of a "logical container," which refers to a logical definition associated with a designated amount of virtual storage. Examples of logical containers include virtual disks, logical containers, and LUNs. In some embodiments, a misalignment correction amount (in number of offsets), if any, is determined for each partition (e.g., starting with the partition associated with the lowest underlying offset if there are more than one partitions). The storage system stores and recalls the per-partition misalignment correction amount for each logical container and uses it to automatically align future misaligned accesses to this container. Then, the storage system determines a correction amount associated with a read or write request associated with the misaligned partition. In various embodiments, the result of the correction of misalignment is such that most, if not all, accesses to the storage subsystem become aligned.

While automatic alignment can be applied to logical containers other than virtual disks, for illustrative purposes, automatic alignment of virtual disks will be discussed in the examples and figures below.

Figure 2:
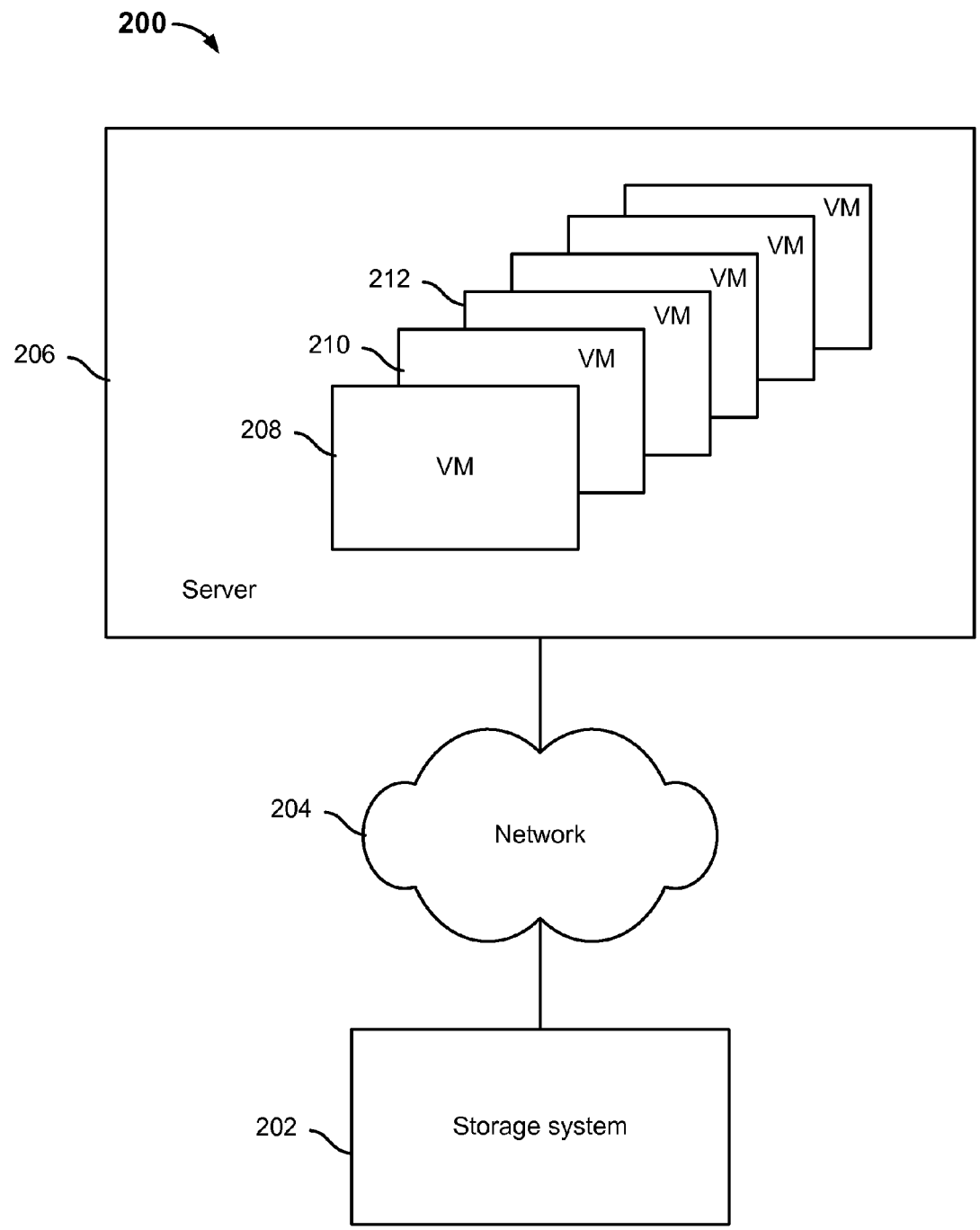
FIG. 2 is a diagram showing an embodiment of a file system for the storage of VMs and virtual disks thereof.

FIG. 2 is a diagram showing an embodiment of a file system for the storage of VMs and virtual disks thereof. In the example shown, system 200 includes server 206, network 204, and storage system 202. In various embodiments, network 204 includes various high speed data networks and/or telecommunications networks. In some embodiments, storage system 202 communicates with server 206 via network 204. In some embodiments, the file system for the storage of VMs and virtual disks thereof does not include network 204 and storage system 202 is a component of server 206. In some embodiments, server 206 is configured to communicate with more storage systems other than storage system 202. In various embodiments, storage system 202 refers to one or more physical systems and/or associated hardware and/or software components configured to work together to store and manage stored data, such as files or other stored data objects. In some embodiments, a hardware component that is used to (at least in part) implement the storage system may comprise either disk or flash, or a combination of disk and flash.

In various embodiments, server 206 runs several VMs. In the example shown, VMs 208, 210, and 212 (and other VMs) are running on server 206. In various embodiments, data associated with the virtual disks(s) of a particular VM is stored at a storage system as one or more files. In some embodiments, the respective files associated with (at least) VMs 208, 210, and 212 running on server 206 are stored at the storage subsystem of storage system 202.

In some embodiments, meta information associated with (at least) VMs 208, 210, and 212 is stored at storage system 202. In some embodiments, the meta information includes information that provides mapping or identification. Meta information includes data associated with locations (e.g., offsets of physical storage) to which files associated with each VM are stored. Meta information also includes attributes and any policies associated with a specific VM. Examples of attributes include a unique identifier of the VM (e.g., a universal unique identifier or UUID), the files or virtual disks that comprise the VM, the storage location of each file or virtual disks associated with the VM, the type of logical container that is being run by the VM, whether the VM is currently active or not, etc. Examples of policies, such as those that relate to storage management, include quality of service (i.e., the difference in prioritization that is given to different applications), performance guarantees, resources quotas, replication, and migration policies for the storage corresponding to the specific VM. In some embodiments, some meta information is provided by the administrator (e.g., through the administrator interface) and some is collected and/or updated from the hypervisor or other management entity (e.g., via queries).

Figure 3:
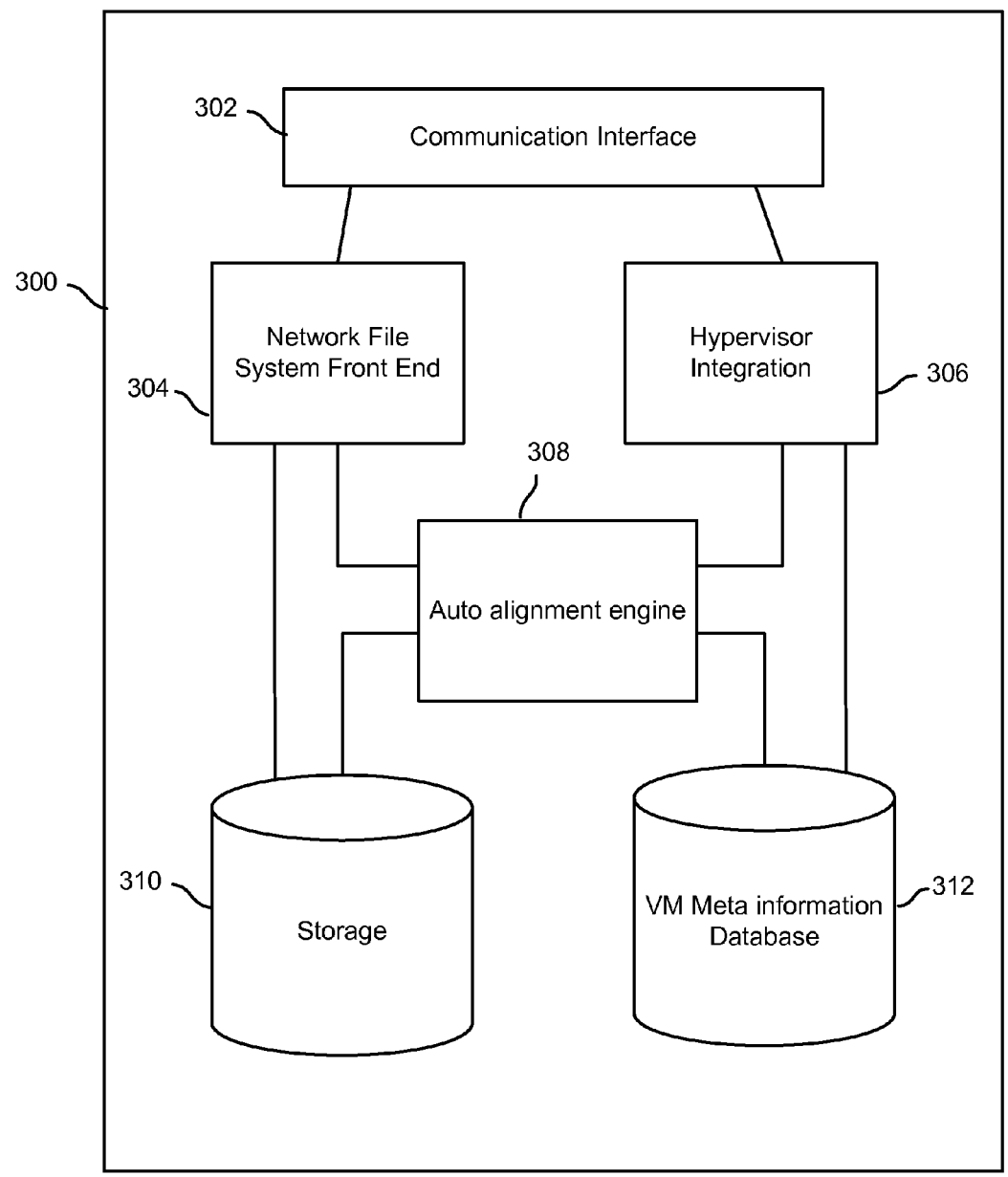
FIG. 3 is a diagram showing an embodiment of a system for automatically aligning blocks of partitions to blocks of physical storage.

FIG. 3 is a diagram showing an embodiment of a system for automatically aligning blocks of partitions to blocks of physical storage. In some embodiments, storage system 202 may be implemented by system 300. In the example shown, system 300 includes communication interface 302, network file system front end 304, hypervisor integration 306, auto alignment engine 308, storage 310, and VM meta information database 312. System 300 may be connected to a network (not shown) to communicate with the host server running one or more VMs. Storage 310 stores the data (e.g., the files) of the one or more VMs. Storage 310 also stores the meta information associated with the one or more VMs. Storage 310 communicates with the host server via communication interface 302 (e.g., a network interface card) and network file system front end 304 via a network protocol. In some embodiments, storage 310 is configured to learn of data transferring to or from the storage via network protocol calls that it receives from the host server. If the transfer of data affects the VMs for which storage 310 stores data and meta information, then the meta information is updated accordingly. A hypervisor (not shown) creates and deletes VMs at the host server and also manages resources among the VMs. Storage 310 is configured to communicate (e.g., over the network and communication interface 302) to the hypervisor through hypervisor integration 306. In some embodiments, hypervisor integration 306 is used to communicate with the hypervisor in order to collect and/or update the meta information stored at storage 310. In some embodiments, VM meta information database 312 also stores at least some of the meta information associated with the VMs running at the server. In some embodiments, storage 310 and VM meta information database 312 store some of the same meta information. In some embodiments, the VM meta information database 312 is not used in system 300.

In various embodiments, auto alignment engine 308 is configured to determine a misalignment amount associated with a partition of each of one or more virtual disks of VMs at the host server. For example, auto alignment engine 308 can first locate a master boot record (MBR) associated with a virtual disk to extract the partition table that indicates the starting and ending offsets of each of the one or more partitions configured for that virtual disk. Then, the determined starting and ending offsets of the partitions can be used to determine a misalignment amount (in number of offsets) of a partition relative to a boundary of a physical block at a storage such as storage 310 associated with each partition. In some embodiments, once auto alignment engine 308 determines the misalignment amount associated with a partition, then auto alignment engine 308 translates an offset associated with each subsequent read and write request to that partition by the determined misalignment amount in an attempt to allow the request to be performed in a manner that is aligned with the physical blocks of storage 310. For example, a read or write request associated with a file written or to be written at a partition is sent (e.g., by an application at the host server over the network) to system 300. The request is received at communication interface 302 and passed to the network file system front end 304, which then passes the request to auto alignment engine 308. Auto alignment engine 308 then translates the one or more virtual disk blocks identified in the request to which the read or write operation is to be performed into a translated offset at which the read or write operation will be performed instead. The translated request with the translated offset is then passed to an associated hypervisor through hypervisor integration 306 and the hypervisor will perform the requested read or write operation at the translated offset of the physical blocks of storage 310. In some embodiments, the hypervisor is unaware that auto alignment engine 308 exists and/or has translated the request to be performed at a translated offset.

Figure 4:
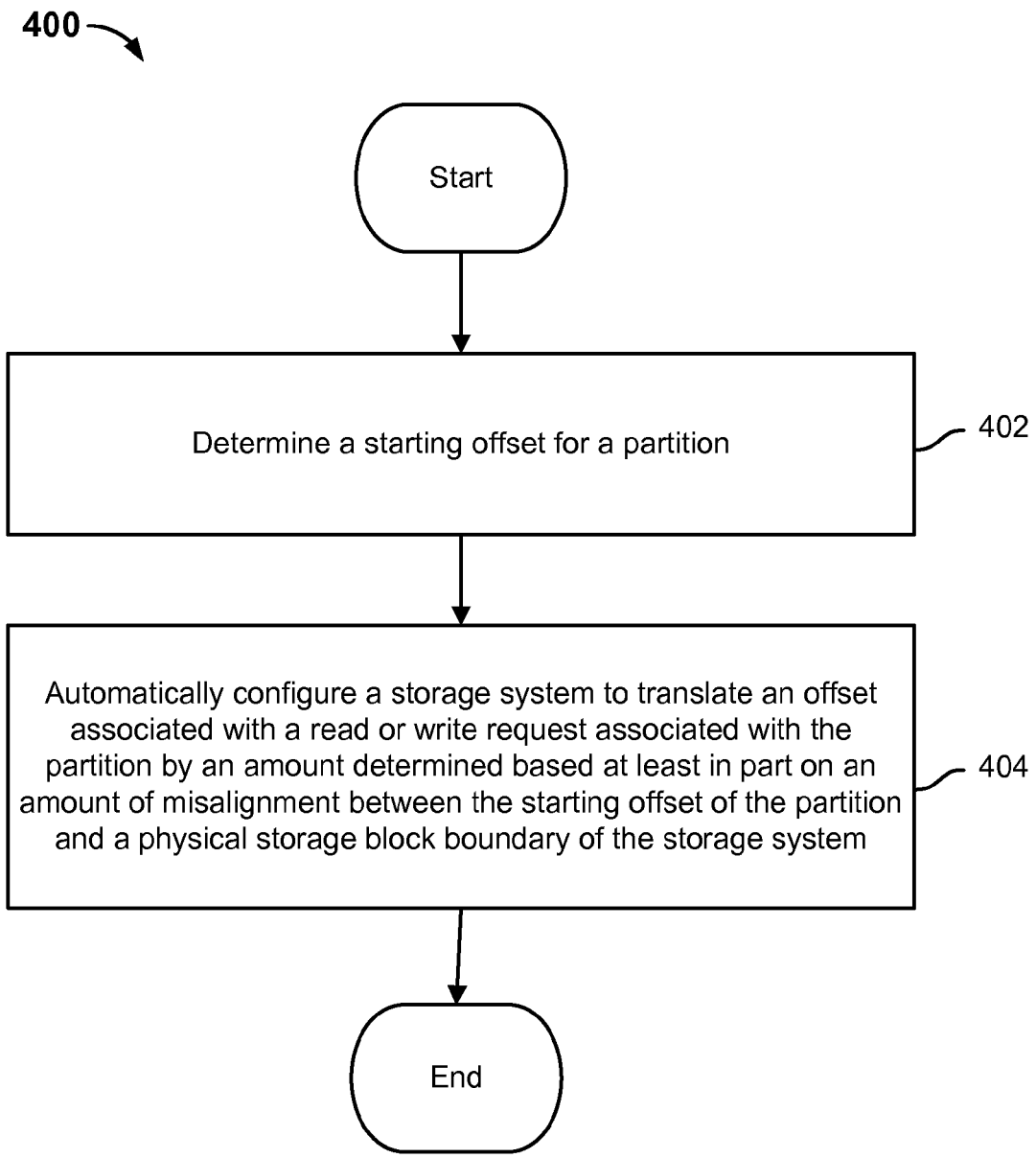
FIG. 4 is a flow diagram showing an embodiment of a process for automatically aligning blocks of partitions to physical blocks of a storage subsystem.

FIG. 4 is a flow diagram showing an embodiment of a process for automatically aligning blocks of partitions to physical blocks of a storage subsystem. In some embodiments, process 400 is performed at system 300.

At 402, a starting offset for a partition is determined. In some embodiments, one or more partitions are included in a virtual disk, in which a starting offset is determined for each of the one or more partitions. In some embodiments, the starting offset of a partition refers to the offset associated with the lowest underlying offset of a physical block to which data associated with the partition is to be stored. In some embodiments, an ending offset of the partition is also determined. In some embodiments, the ending offset of a partition refers to the offset associated with the highest underlying offset of a physical block to which data associated with the partition is to be stored. In some embodiments, a virtual disk reserved space of the virtual disk is programmatically detected. In some embodiments, each of the starting and ending offsets of the partitions relative to the virtual disks are determined from a partition table extracted from a portion (e.g., MBR) of the virtual disk reserved space. In some embodiments, each of the starting and ending offsets of the partitions (e.g., relative to the virtual disks) are detected based on known bit patterns associated with the starts and ends of partitions (e.g., associated with particular guest operating systems).

At 404, a storage system is automatically configured to translate an offset associated with a read or write request associated with the partition by an amount determined based at least in part on an amount of misalignment between the starting offset of the partition and a physical storage block boundary of the storage system. In some embodiments, once at least the starting offset of a partition is determined, a misalignment correction amount is then determined for the partition and also stored. The stored misalignment correction amount associated with a partition can be retrieved from storage and used to translate an offset associated with a subsequently received read or write request associated with that partition so that the requested data is read from or written to a translated offset. By performing read and write requests at translated offsets, the access time of the data can be reduced.

Figure 5:
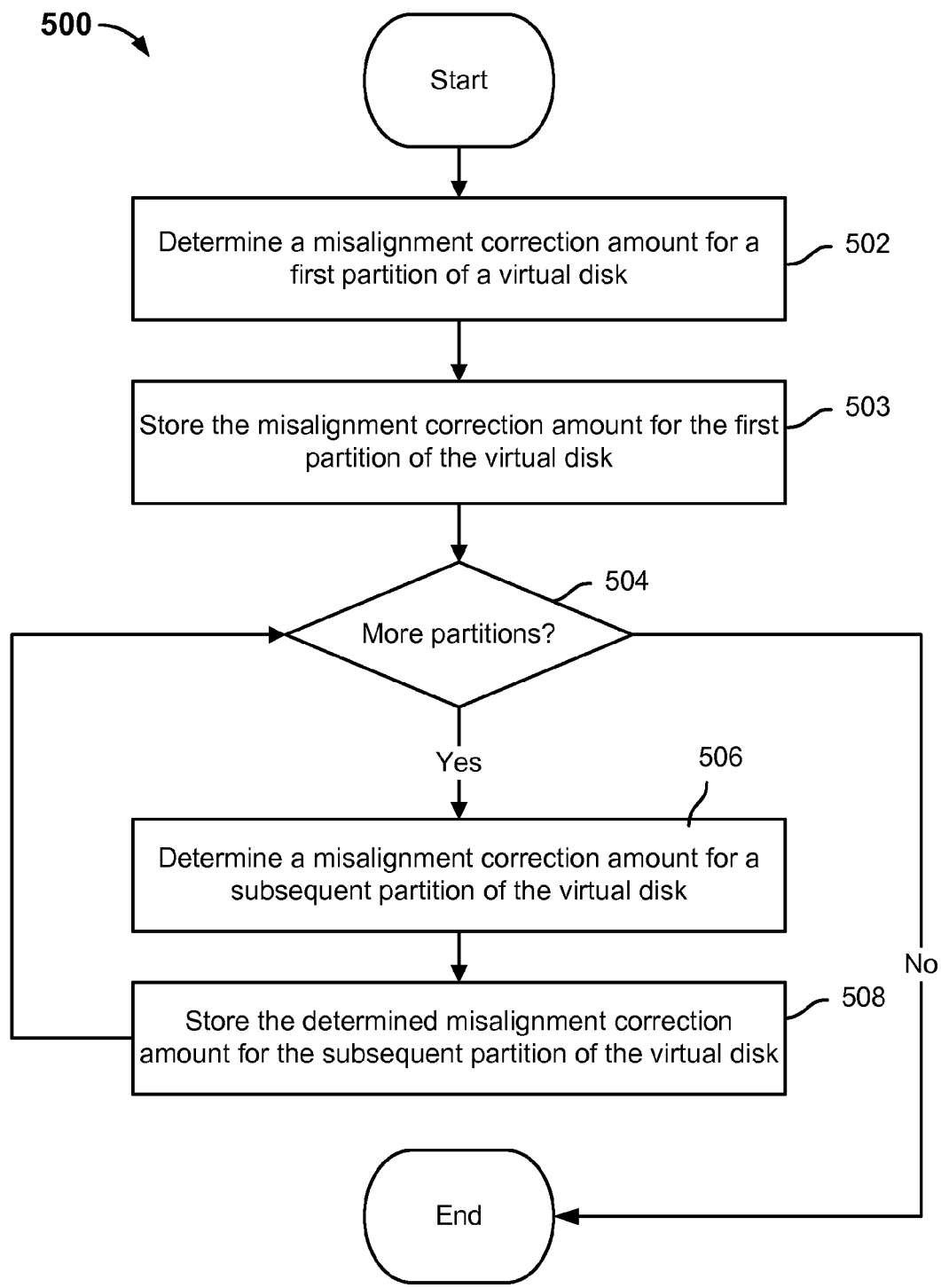
FIG. 5 is a flow diagram showing an embodiment of a process for determining the misalignment amount of each of one or more partitions of a virtual disk.

FIG. 5 is a flow diagram showing an embodiment of a process for determining the misalignment amount of each of one or more partitions of a virtual disk. In some embodiments, process 500 is performed at system 300.

In some embodiments, process 500 can be initiated at the creation of a new virtual disk (e.g., by a hypervisor). The virtual disk can be created with one or more partitions and each partition can be of a user-configurable size (e.g., one partition can be configured to be 1 gigabyte (GB) in size and another partition can be configured to be 2 GB in size). In some embodiments, two or more successive partitions map to contiguous physical blocks or non-contiguous physical blocks. In some embodiments, one or more partitions can be created when the virtual disk is created and one or more partitions can also be added to the virtual disk sometime after the initial creation of the virtual disk. In various embodiments, the misalignment amount determined for each partition is stored. In some embodiments, the misalignment amount determined for each partition can be added to one or both of the original underlying starting and ending offsets of a partition to effectively adjust/shift the mapping of the partition for the purposes of making it aligned with the underlying physical blocks of the storage subsystem. Then, the storage system can translate and perform read and write requests to the adjusted partition so that the beginning of a virtual disk block of the partition can likely match with the beginning of a physical block of the underlying storage subsystem. Without such translation to the adjusted offsets for the misaligned partitions, a read and write request to the misaligned partitions would have potentially straddled multiple physical blocks. In some embodiments, new virtual disks are created to store the adjusted offsets of the partitions. For example, a new virtual disk can be created for each adjusted partition such that each newly created partition would be aligned as it would start at offset 0.

At 502, a misalignment correction amount for a first partition of a virtual disk is determined. In this example, the first partition can refer to any partition of the virtual disk and is not necessarily associated with the partition with the lowest underlying starting offset. Once at least the starting offset of the first partition is determined (e.g., by reading the partition table extracted from the virtual disk reserved space), then a misalignment correction amount of the first partition can be determined. In some embodiments, it is first determined whether the underlying starting offset of the partition is aligned. For example, if the underlying starting offset of the first partition is a multiple of the size of each physical block, then the first partition is aligned and so the misalignment correction amount of the first partition would be zero (i.e., [Underlying starting offset of the first partition] mod [physical block size]==0). But if the underlying starting offset of the first partition is not a multiple of the size of each physical block (i.e., [Underlying starting offset of the first partition] mod [physical block size]!=0), then the first partition is misaligned and the misalignment correction amount of the first partition is greater than zero. For example, if the first partition started at underlying starting offset 32,256 bytes and if the physical block size were 32,768 bytes, then the partition is misaligned because 32,256 mod 32,768 equals 32,256 and not zero.

For example, the misalignment correction amount of the first partition can be determined as the difference between the physical block size and the underlying starting offset of the first partition modulo the physical block size. Returning to the previous example, the misalignment correction amount determined for the first partition can be 32,768 bytes–32,256 bytes=512 bytes. So, the starting offset of the first partition can be adjusted/shifted by the misalignment correction amount (i.e., 32,256 bytes+512 bytes) and the end offset of the first partition can be accordingly adjusted/shifted by the misalignment correction amount.

At 503, the misalignment correction amount determined for the first partition of the virtual disk is stored. The misalignment correction determined for the first partition is stored so that it can be retrieved later to translate a request to access data associated with the first partition.

At 504, it is determined if there are more partitions created for the virtual disk for which misalignment correction amounts have not yet been determined. In some embodiments, the determination for more partitions, each at a successively higher underlying offset than that associated with the first partition, can be determined soon after the creation of the virtual disk or at a later time. In some embodiments, the determination of 504 can be made continuously or periodically until the operation of the storage system is stopped for some reason, so that newly added partitions can be detected and then misalignment correction amounts can be determined for them. In the event that it is determined that at least one more partition is detected, then control passes to 506. In the event that it is determined that no other partitions are detected, then process 500 ends.

At 506, a misalignment correction amount for a subsequent partition of the virtual disk is determined. For example, if the previously determined partition was the partition associated with the lowest underlying offset of the virtual disk, then the subsequent partition of the virtual disk is associated with the second lowest underlying offset. Or, for example, if the previously determined partition was the partition associated with the second lowest underlying offset, then this subsequent partition would be the partition associated with the third lowest underlying offset, and so forth. In some embodiments, the misalignment correction amount of the subsequent partition includes at least the misalignment correction amount(s) of the previous partition(s) because the subsequent partition needs to be adjusted such that the subsequent partition does not overlap with the previous partition(s). Once the subsequent partition is adjusted/shifted from its original starting (and ending) offsets designated by the virtual disk by the misalignment correction amount(s) of the previous partition(s), the adjusted underlying starting offset of the subsequent partition may not be a multiple of the size of each physical block and so the shifted subsequent partition is misaligned and needs to be adjusted further. So, in some embodiments, the misalignment correction amount of the subsequent partition is the combination of the misalignment correction amount of the previous partition(s) and also the difference between the physical block size and the underlying starting offset of the subsequent partition adjusted/shifted by the misalignment correction amount of the previous partition(s) modulo the physical block size. Therefore, the misalignment correction amount determined for the subsequent partition will be used to adjust the underlying starting (and ending) offsets of the subsequent partition such that the subsequent partition does not overlap with any previous partitions and also becomes aligned with the physical blocks.

At 508, the determined misalignment correction amount for the subsequent partition of the virtual disk is stored. The misalignment correction determined for the subsequent partition is stored so that it can be retrieved later to translate a request to access data associated with the subsequent partition. After 508, process 500 returns to 504, where it is determined whether there are more partitions created for the virtual disk for which misalignment correction amounts have not yet been determined.

Figure 6A:
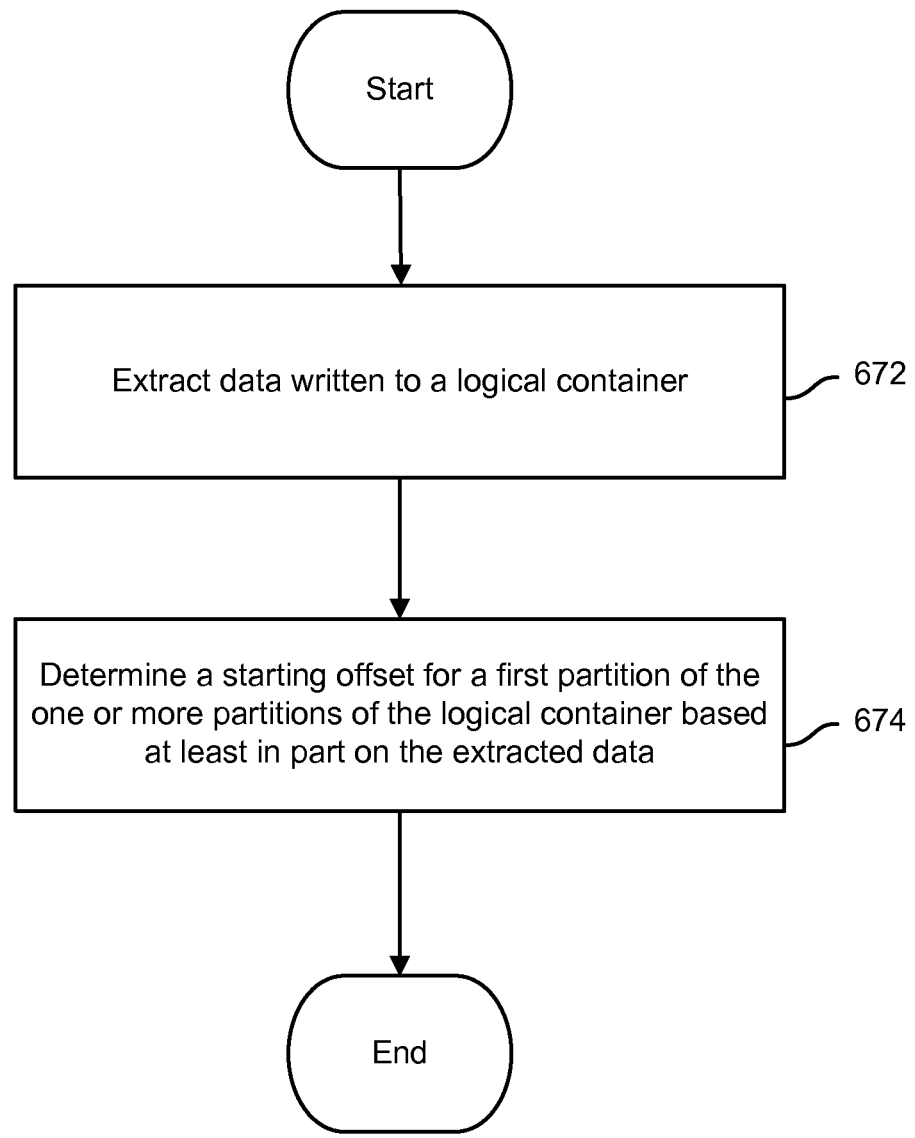
FIG. 6A is a flow diagram showing an embodiment of a process for determining the boundaries of the partitions of a logical container.

FIG. 6A is a flow diagram showing an embodiment of a process for determining the boundaries of the partitions of a logical container. In some embodiments, process 670 is implemented at system 300. In some embodiments, process 670 is implemented at least in part using process 650.

At 672, data written to a logical container is extracted. In some embodiments, data describing the partitions of a logical container (e.g., a virtual disk) is written to an area of the logical container and can be extracted once such data is detected. At 674, a starting offset for a first partition of the one or more partitions of the logical container is determined based at least in part on the extracted data. In this example, a first partition can refer to the any one or more partitions of the logical container and not necessarily the partition associated with the lowest underlying offset. For example, the starting offset of each of the partitions of the virtual disk can be read from the extracted partition description data. In some embodiments, the starting offset determined for each partition is stored to be used later, for example, to determine a misalignment correction amount for each partition.

Figure 6B:
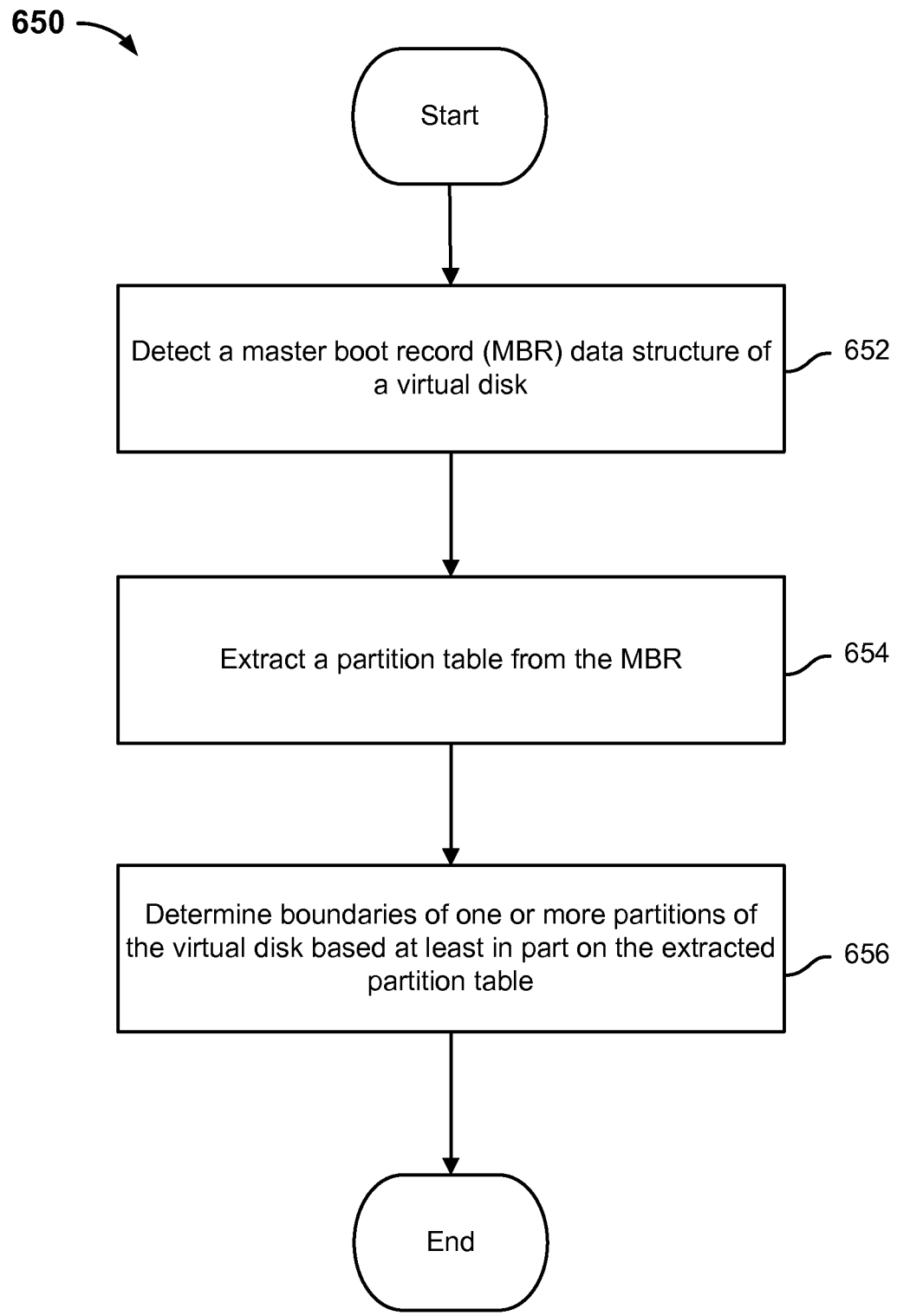
FIG. 6B is a flow diagram showing an embodiment of a process for determining the boundaries of the partitions of a virtual disk.

FIG. 6B is a flow diagram showing an embodiment of a process for determining the boundaries of the partitions of a virtual disk. In some embodiments, process 650 is implemented at system 300.

At 652, a master boot record (MBR) data structure of a virtual disk is detected. The MBR is an example of a set of data that is written to an area of a virtual disk and that describes the attributes of a virtual disk including the attributes of the partitions of the virtual disk. The MBR is usually written to the virtual disk reserved space of the virtual disk. Generally, the MBR is written around the time that the virtual disk is created. In some embodiments, the MBR of a virtual disk can be detected based on monitoring the disk location to which the MBR is written or by detecting data patterns that indicate that data is being written to the MBR.

At 654, a partition table is extracted from the MBR. A partition table that is stored as part of the MBR includes at least the starting offset and ending offset of each partition relative to the start of the virtual disk (i.e., the start of the virtual disk is offset zero relative to the virtual disk).

At 656, boundaries of one or more partitions of the virtual disk are determined based at least in part on the extracted partition table. The extracted partition table is then read to determine the boundaries (e.g., starting and ending offsets) of the partitions and their respective sizes. In some embodiments, at least a portion of the partition table is stored so that the starting offsets of partitions of the virtual disk can be recalled later in determining misalignment correction amounts.

FIGS. 6C and 6D are examples showing the determination of the boundaries of the partitions of a virtual disk and also the determination of misalignment correction amounts by using data extracted from the virtual disk reserved space of the virtual disk based at least in part on process 650. In some embodiments, 402 of process 400 is implemented with the examples of FIGS. 6C and 6D.

In FIG. 6C, a master boot record (MBR) data structure comprises at least some of the data stored in virtual disk reserved space 602. In the example of FIG. 6C, the starting offset of Partition 1 is labeled as "Partition 1 Starting Offset" and the ending offset of Partition 1 is labeled as "Partition 1 Ending Offset," the starting offset of Partition 2 is labeled as "Partition 2 Starting Offset" and the ending offset of Partition 2 is labeled as "Partition 2 Ending Offset." Such starting and ending offsets of partitions relative to the virtual disk are the boundaries of the partitions. FIG. 6D is an example of a partition table extracted from the MBR from virtual disk 600. In the example, Partition 1 Starting Offset is located at 31.5 KB and Partition 1 Ending Offset is located at 1024 KB. Furthermore, Partition 2 Starting Offset is located at 1024 KB and Partition 2 Ending Offset is located at 100 GB. The misalignment correction amount of Partition 1 can be determined, for example, as the difference between the size of each physical block and Partition 1 Starting Offset (31.5 KB) modulo the size of each physical block. Then the determined misalignment correction amount will be used to adjust/shift the first and subsequent partitions and used to translate subsequent read and write requests to the adjusted/shifted starting and ending offsets of the detected partitions.

Figure 7A:
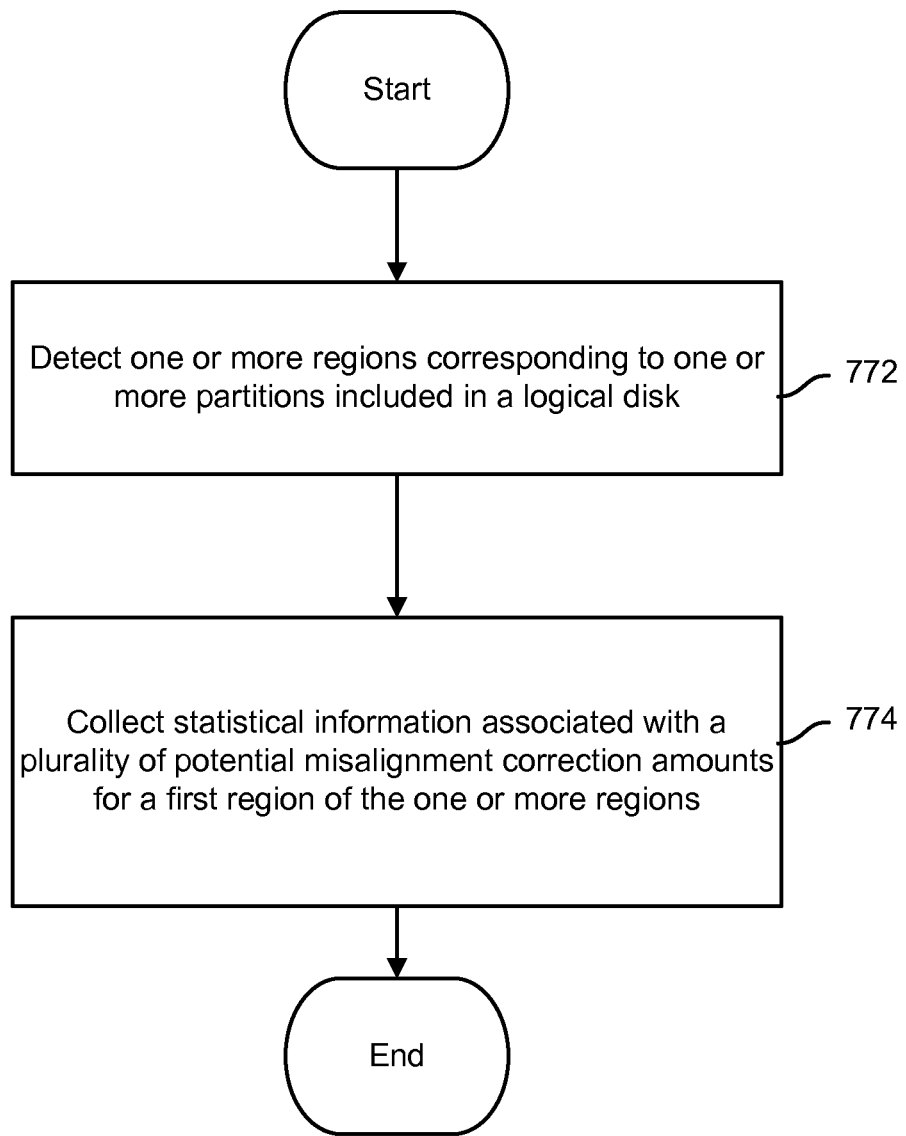
FIG. 7A is a flow diagram showing an embodiment of a process for determining the boundaries of the partitions of a virtual disk and also determining misalignment correction amounts by tracking actual disk access patterns over time.

FIG. 7A is a flow diagram showing an embodiment of a process for determining the boundaries of the partitions of a virtual disk and also determining misalignment correction amounts by tracking actual disk access patterns over time. In some embodiments, process 750 is implemented at system 300. In some embodiments, process 770 can be used alternatively to process 670.

At 772, one or more regions corresponding to one or more partitions included in a logical container are detected. In some embodiments, particularly in those where a partition table is not available, readable, and/or otherwise not understandable such that explicit boundary information associated with the one or more partitions is not available, one or more regions of a logical container can be approximated as the corresponding regions of the one or more partitions of the logical container.

For example, each region can be detected based on known bit patterns associated with the beginning and ends of partitions. In another example, the logical container can be divided into various regions based on preconfigured rules. At 774, statistical information associated with a plurality of potential misalignment correction amounts for a first region of the one or more regions is collected. In this example, a first region can correspond to the any one or more partitions of the logical container and not necessarily the partition associated with the lowest underlying offset. In some embodiments, statistical information can be collected over time for accesses associated with each of the detected regions and then used to determine a misalignment correction amount for each detected region and therefore, its corresponding partition. In some embodiments, the determined misalignment correction amount for each partition is stored to be used later, for example, to determine a misalignment translation for each partition.

Figure 7B:
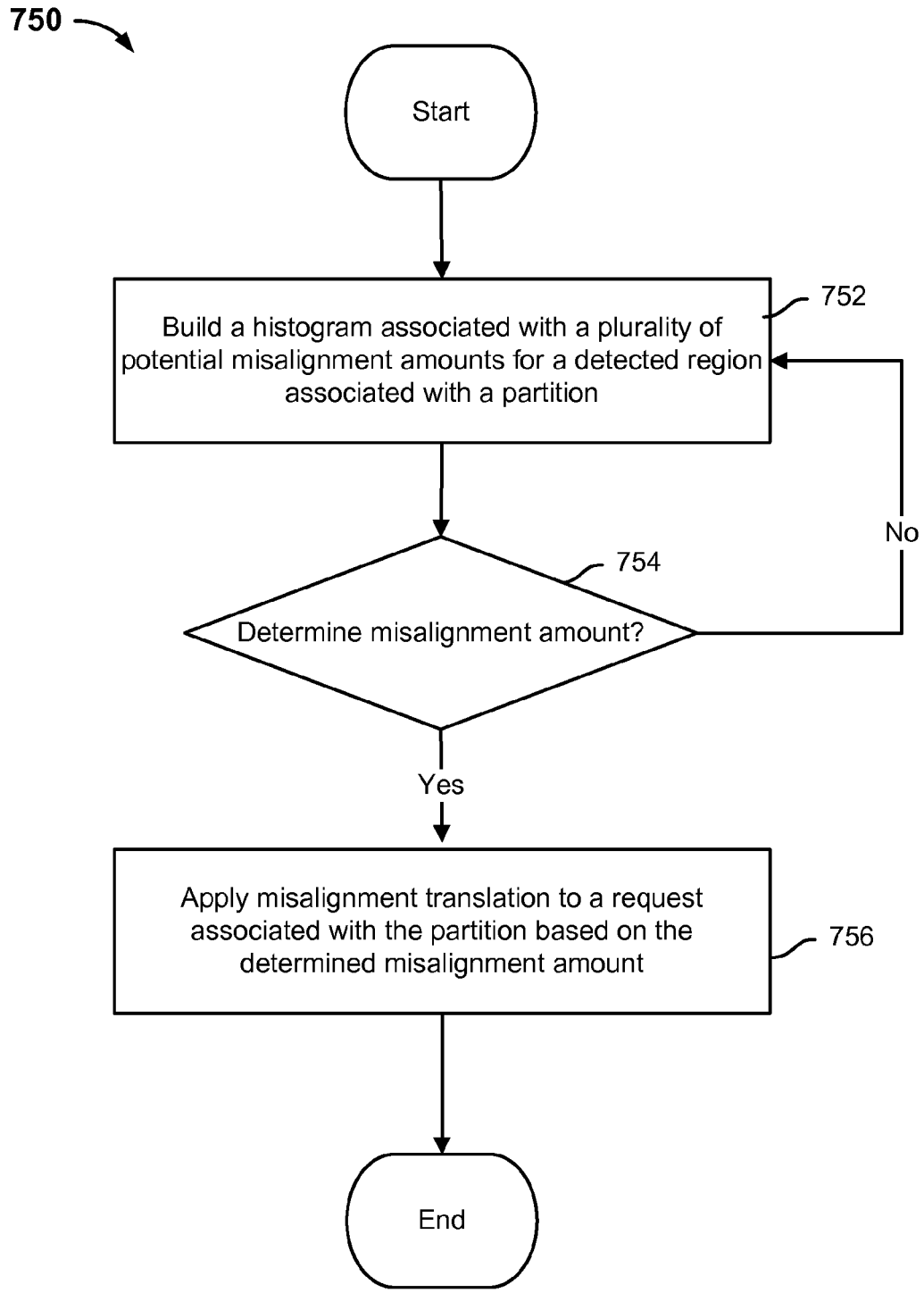
FIG. 7B is a flow diagram showing an embodiment of a process for determining the boundaries of the partitions of a virtual disk and also determining misalignment correction amounts by tracking actual disk access patterns over time.

FIG. 7B is a flow diagram showing an embodiment of a process for determining the boundaries of the partitions of a virtual disk and also determining misalignment correction amounts by tracking actual disk access patterns over time. In some embodiments, process 750 is implemented at system 300. In some embodiments, process 770 is implemented at least in part using process 750.

At 752, a histogram associated with a plurality of potential misalignment correction amounts is built for a detected region associated with a partition. For example, the approximated underlying starting and ending offsets of regions of partitions of a virtual disk can be detected by identifying bit patterns known to be associated with whichever virtual disk is associated with the virtual disk or using preconfigured rules. Each detected region is used to represent a partition. Then, statistical information associated with actual disk access patterns is maintained for each detected region over a configurable period of time. For example, maintaining statistical information can include creating a histogram of the number of actual accesses at various potential misalignment correction amounts for each region, where each potential misalignment correction amount is the offset of the access modulo the size of each physical block of the underlying storage subsystem. Each time an access is made to a region, a potential misalignment correction amount that is the offset of the access modulo the physical block size is incremented by one.

At 754, it is determined whether to determine a misalignment correction amount for the partition. In some embodiments, at the end of the configured period of time for maintaining the histogram, the potential misalignment correction amount associated with the highest number of accesses or some other statistically significant metric is determined to be the misalignment correction amount for the detected region and thus the partition that it represents. This determined misalignment correction amount will be used to adjust/shift the partition and used to translate subsequent read and write requests to the detected partition. In the event that the configured period of time is over, then this determination is made and control passes to 756. In the event that the configured period is not over, then control returns to 752, where the number of accesses is further maintained.

At 756, misalignment translation is applied to a request associated with the partition based on the determined misalignment correction amount. The determined misalignment correction amount is used to translate an underlying offset associated with a subsequently received request to the partition so that the requested operation will be performed at the translated offset instead of the offset originally indicated by the request.

Figure 7C:
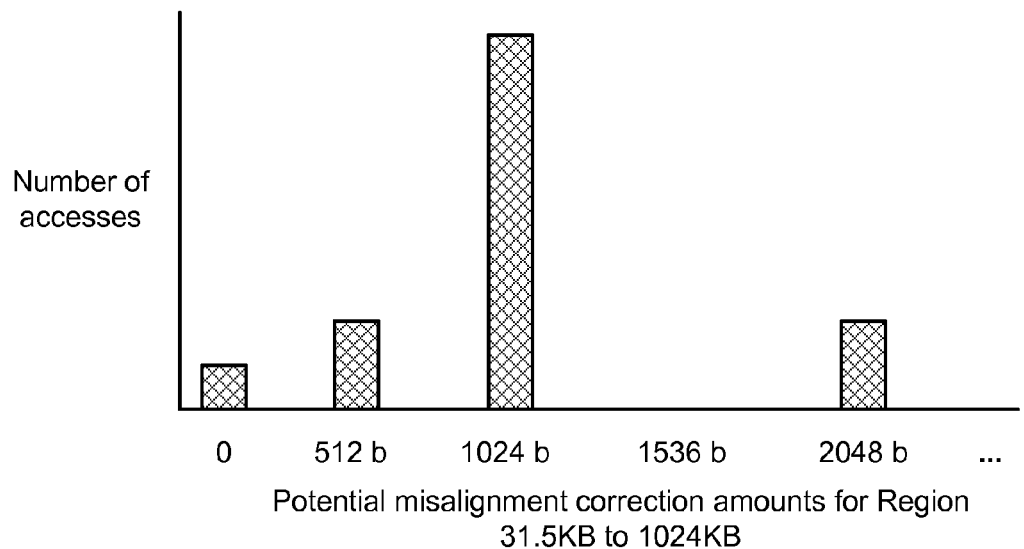
FIG. 7C shows a histogram for a detected region at 31.5 KB to 1024 KB of a virtual disk.
Figure 7D:
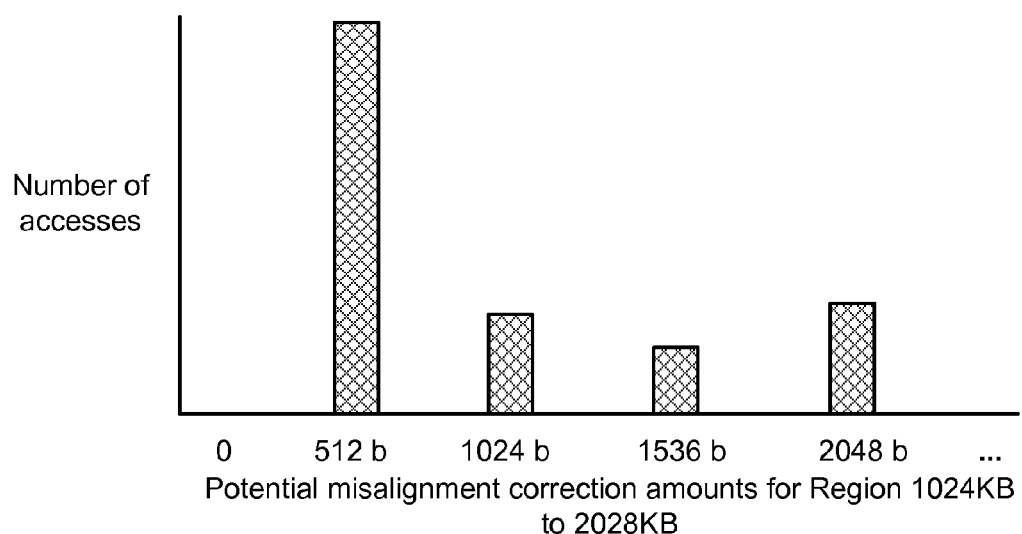
FIG. 7D shows a histogram for a detected region at 1024 KB to 2028 KB of the virtual disk.

FIGS. 7C and 7D are examples determining the boundaries of the partitions of a virtual disk and also determining misalignment correction amounts by tracking actual disk access patterns over time based at least in part on process 750. In some embodiments, 402 of process 400 is implemented with the examples of FIGS. 7C and 7D. FIG. 7C shows a histogram for a detected region at 31.5 KB to 1024 KB of a virtual disk and FIG. 7D shows a histogram for a detected region at 1024 KB to 2028 KB of the virtual disk. Each time that an access is made to either the region at 31.5 KB to 1024 KB or the region at 1024 KB to 2028 KB of the virtual disk, the number of accesses of a corresponding potential misalignment correction amount is incremented by one. In FIG. 7C, the potential misalignment for region 31.5 KB to 1024 KB with the highest number of accesses is 1024 bytes, so 1024 bytes is determined to be the misalignment correction amount for region 31.5 KB to 1024 KB. In FIG. 7D, the potential misalignment for region 1024 KB to 2028 KB with the highest number of accesses is 512 bytes so 512 bytes is determined to be the misalignment correction amount for region 1024 KB to 2028 KB. In some embodiments, the determined misalignment correction amount of a detected partition region other than the detected partition region at the lowest underlying starting offset will be adjusted so as to prevent this detected partition region from overlapping with a detected partition region at a lower underlying starting offset.

Figure 8:
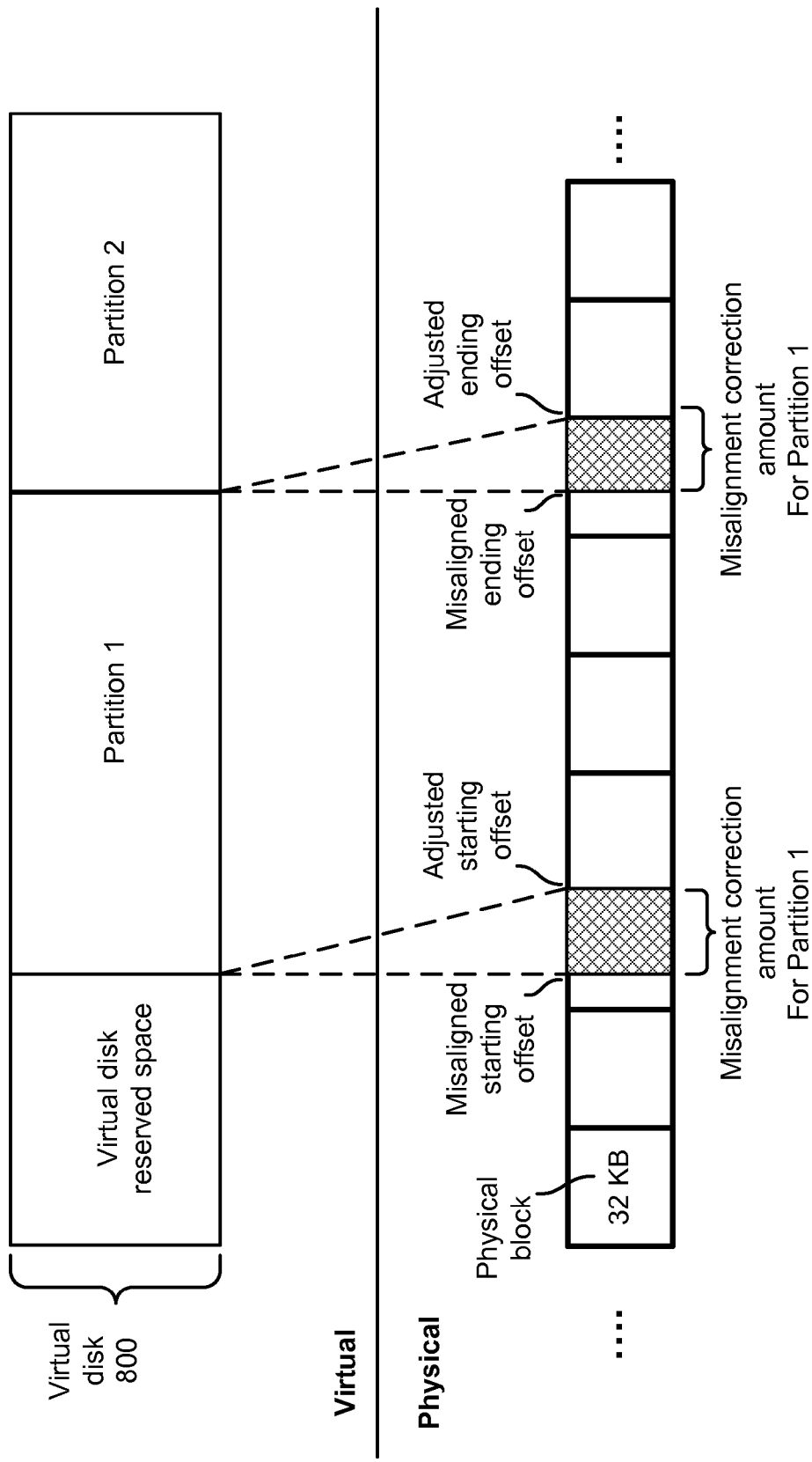
FIG. 8 is a diagram showing an embodiment of a process for determining a misalignment correction amount for the partition associated with the lowest underlying offset in a virtual disk.

FIG. 8 is a diagram showing an embodiment of a process for determining a misalignment correction amount for the partition associated with the lowest underlying offset in a virtual disk. In the example, virtual disk 800 includes a virtual disk reserved space, Partition 1, which is the partition associated with the lowest underlying offset of the virtual disk, and Partition 2, which is the partition associated with the lowest underlying offset of the virtual disk. Partition 1 is the partition with the lower underlying starting offset and Partition 2 is the partition with the higher underlying starting offset. In the example, the underlying starting offset of Partition 1 (e.g., as determined by reading a partition table extracted from the MBR data structure of the virtual disk reserved space) is misaligned because it is not a multiple of the size of each physical block (i.e., [Underlying starting offset of Partition 1] modulo [physical block size]!=0). The determined misalignment correction amount for Partition 1 is shown in the example as the difference between the misaligned starting offset of Partition 1 and the starting boundary offset of the next physical block. Partition 1 is adjusted by the determined misalignment correction amount for Partition 1 so the starting offset of Partition 1 is adjusted to be at the starting boundary offset of the next physical block. Similarly (and optionally), the end offset of Partition 1 is also adjusted by the misalignment correction amount for Partition 1 so as to preserve the original size of Partition 1. The adjusted starting offset (and adjusted ending offset) of Partition 1 are stored to be used to translate subsequently read and write requests to Partition 1 so that the requested data can be read from or written to virtual disk blocks that are likely aligned with the physical blocks of the underlying storage subsystem.

Figure 9:
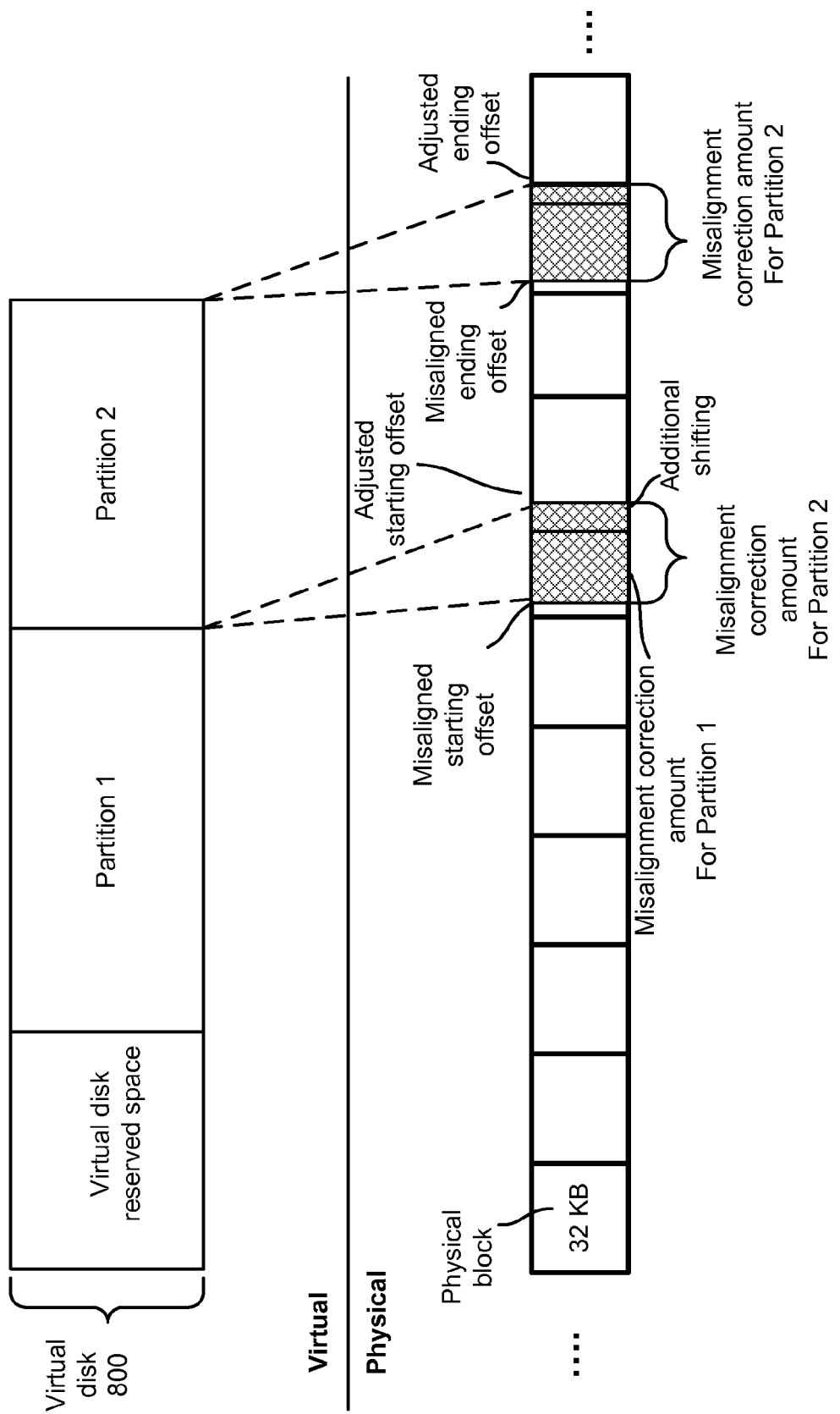
FIG. 9 is a diagram showing an embodiment of determining a misalignment correction amount for the partition associated with the second lowest underlying offset in a virtual disk.

FIG. 9 is a diagram showing an embodiment of determining a misalignment correction amount for the partition associated with the second lowest underlying offset in a virtual disk. In the example, a misalignment correction amount is now being determined for Partition 2 of virtual disk 800. The underlying starting offset of Partition 2 (e.g., as determined by reading a partition table extracted from the MBR data structure of the virtual disk reserved space) is first adjusted/shifted by the misalignment correction amount for Partition 1 so that Partition 2 will not overlap with Partition 1. However, once it is determined that the offset of the underlying starting offset of Partition 2 adjusted/shifted by misalignment correction amount for Partition 1 is not a multiple of the size of each physical block, then the underlying starting offset of Partition 2 is further shifted until it becomes a multiple of the size of each physical block. As such, the misalignment correction amount for Partition 2 is the combination of the misalignment correction amount for Partition 1 and additional shifting that brings the adjusted underlying starting offset of Partition 2 to be aligned with a starting boundary offset of a physical block ([Adjusted starting offset of Partition 2] modulo [physical block size]=0). Similarly and optionally, the ending offset of Partition 2 also needs to be adjusted by the misalignment correction amount for Partition 2 so as to preserve the original size of Partition 2. The adjusted starting offset (and adjusted ending offset) of Partition 2 are stored to be used to translate read and write requests to Partition 2 so that the requested data can be read from or written to virtual disk blocks that are likely aligned with the physical blocks of the underlying storage subsystem. The same technique applied to Partition 2 can be applied to any subsequent partitions that may be added to virtual disk 800.

Figure 10:
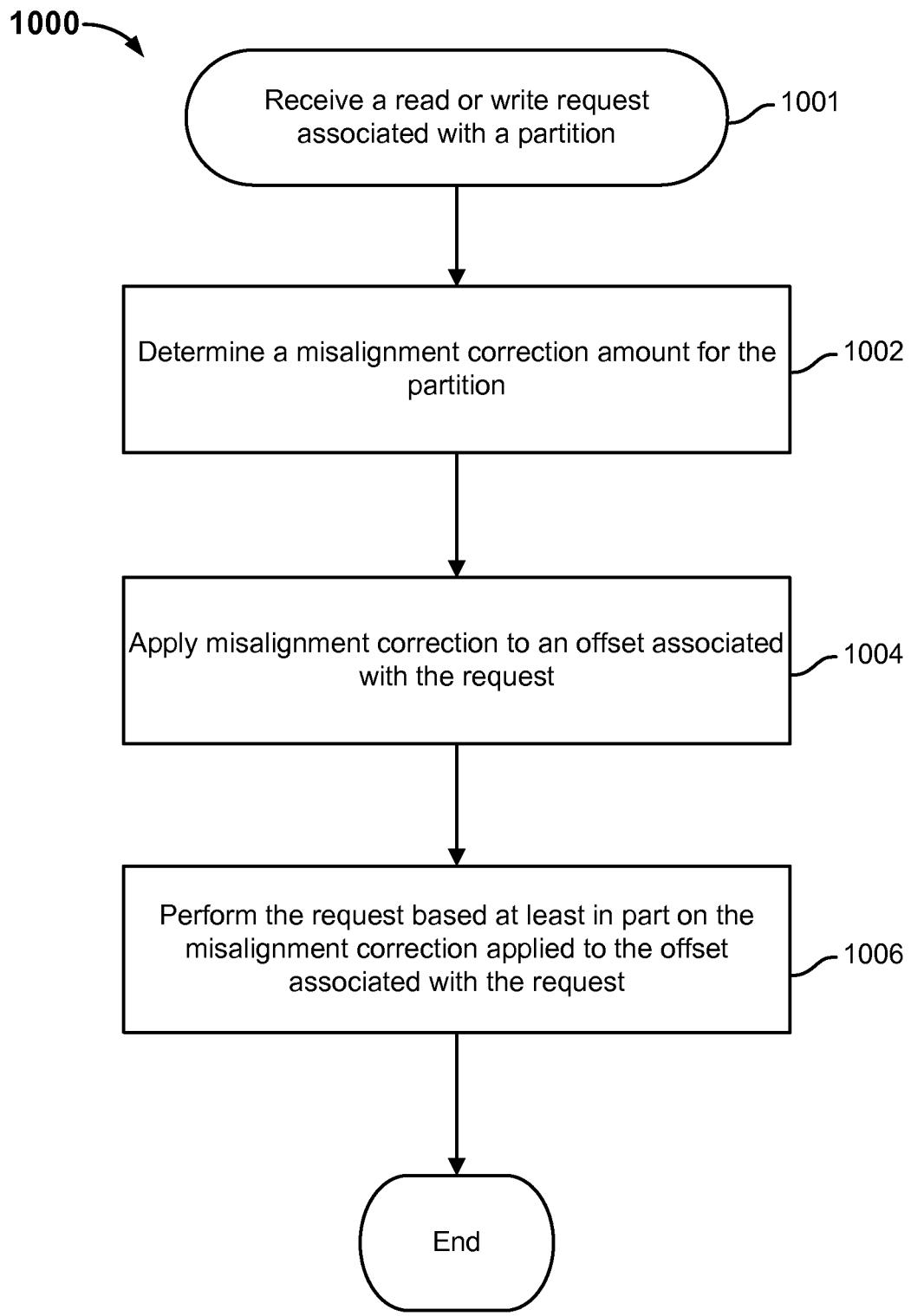
FIG. 10 is a flow diagram showing an embodiment of a process for configuring a storage system to translate an offset of a read or write request by at least a misalignment correction amount.

FIG. 10 is a flow diagram showing an embodiment of a process for configuring a storage system to translate an offset of a read or write request by at least a misalignment correction amount. In some embodiments, process 1000 is implemented at system 300. In some embodiments, 404 of process 400 is implemented with process 1000.

Process 1000 begins at 1001 when a request to perform a read or write operation at a partition of a virtual disk is received at the storage system such as system 300. In some embodiments, the read or write request includes at least an identifier of the VM with which the virtual disk is associated, an identifier of the partition within the virtual disk to which the request is to be performed, and also one or more virtual disk blocks in the partition at which data is to be written to or read from.

At 1002, a misalignment correction amount associated with the partition is determined. In some embodiments, if a misalignment correction amount associated with the partition has already been determined and stored, then the stored misalignment correction amount can be retrieved. Otherwise, if the misalignment correction amount has not yet been determined, then it can be determined using a technique described by FIGS. 6A, 6B, 6C, and 6D or by FIGS. 7A, 7B, 7C, and 7D.

At 1004, the misalignment correction amount is applied to an offset associated with the request. In some embodiments, a starting offset of the underlying storage system corresponding to the one or more virtual disk blocks identified in the request is determined. In various embodiments, applying misalignment correction to the determined offset associated with the request refers to adjusting/shifting/translating the determined offset associated with the request with the misalignment correction amount determined in 1002. The adjusted/shifted underlying offset for the request may likely be aligned with a starting boundary offset of a physical block. For example, if the underlying offset associated with a request was at 65,024 bytes (the physical block size was 32,778 bytes) and the misalignment correction amount was 512 bytes, then the adjusted underlying offset for the request would be 65,024 bytes+512 bytes=65,536 bytes.

At 1006, the request is performed based at least in part on the misalignment correction applied to the offset associated with the request. In various embodiments, the requested read or write operation would be performed at the underlying storage system at the adjusted/translated underlying offset for the request instead of the underlying offset originally associated with the request. Returning to the previous example, whereas the underlying offset originally associated with the request was 65,024 bytes, the requested operation will instead be performed at the adjusted underlying offset of 65,536 bytes. For example, if the request were a write operation, then data that would have been written to offset of 65,024 bytes would instead be written to 65,536 bytes. Also for example, if a subsequent read operation requested to read data at (not corrected) the underlying offset of 65,024 bytes, then that offset will be corrected such that the requested data will be read from the adjusted underlying offset of 65,536 bytes, where the data is actually stored.

Figure 11:
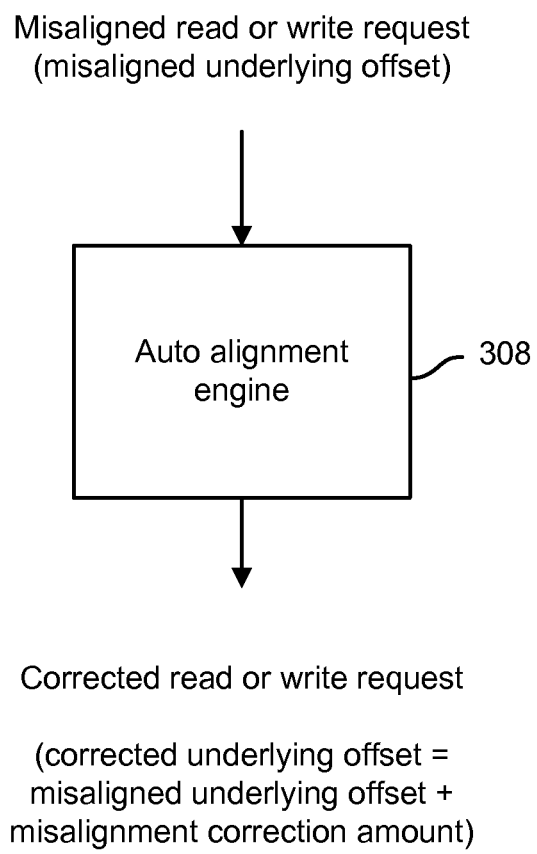
FIG. 11 is a diagram showing an embodiment of applying misalignment correction for read or write requests associated with a partition of the virtual disk.

FIG. 11 is a diagram showing an embodiment of applying misalignment correction for read or write requests associated with a partition of the virtual disk. In some embodiments, auto alignment engine 308 of system 300 can be used as shown in the example. A misaligned read or write request associated with a partition is received at a storage system such as system 300. The request associated with a misaligned underlying offset is input to auto alignment engine 308. In some embodiments, auto alignment engine 308 can perform at least a portion of process 1000. After processing, auto alignment engine 308 outputs a corrected read or write request that is newly associated with an adjusted/translated underlying offset, at which the request operation will be performed. For example, the adjusted/translated underlying offset is the sum of the misaligned underlying offset and the misalignment correction amount determined for the partition associated with the request. Performing the requested operation at the corrected underlying offset will likely be better than performing the requested operation at the original, not corrected underlying offset of the request.

Figure 12:
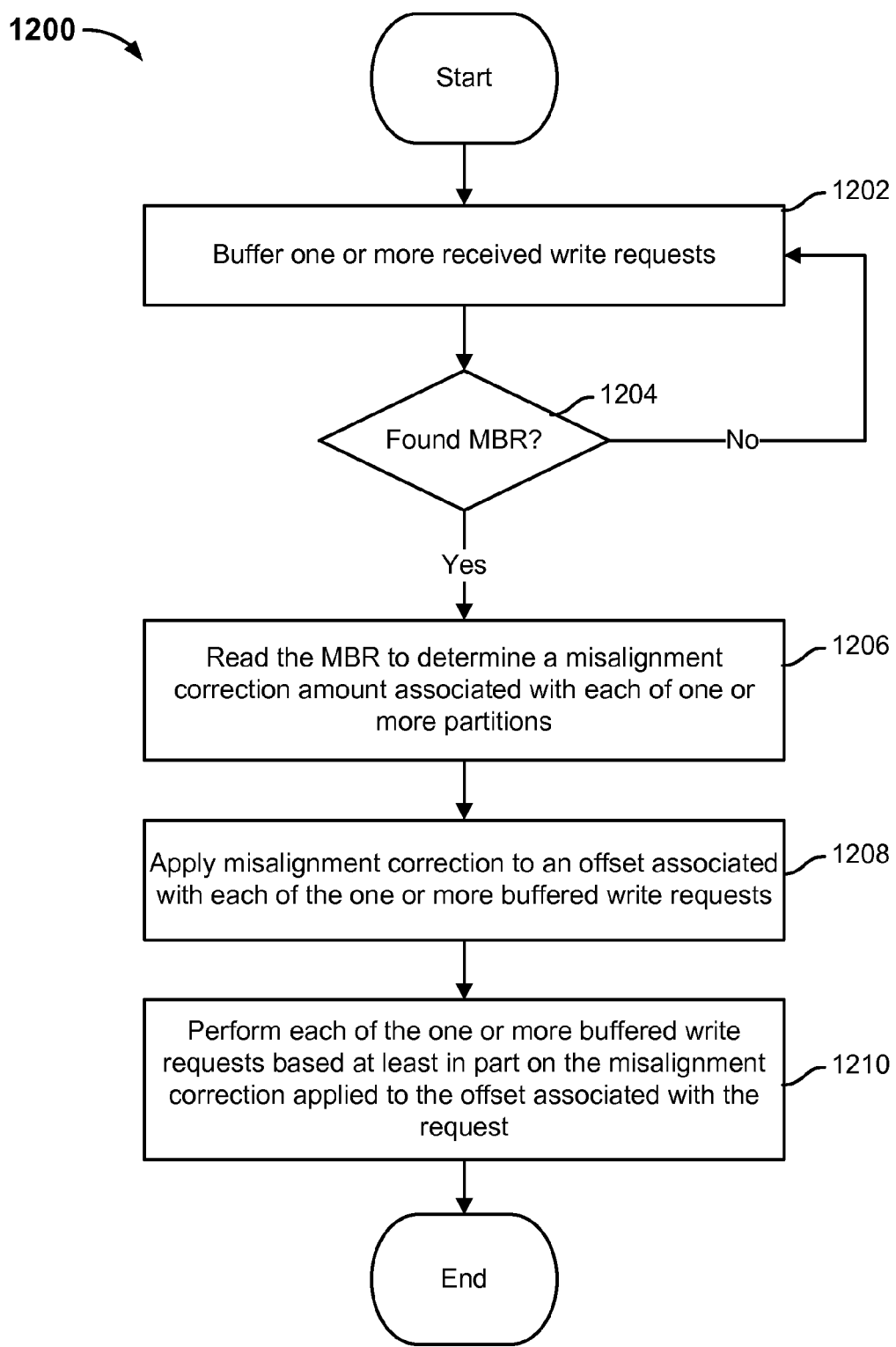
FIG. 12 is a flow diagram showing an embodiment of a process for buffering write requests until the MBR of the virtual disk is located.

FIG. 12 is a flow diagram showing an embodiment of a process for buffering write requests until the MBR of the virtual disk is located. In some embodiments, process 1200 is implemented at system 300.

In some embodiments where the MBR data structure is extracted and the partition table thereof is read to determine the boundaries of partitions in a virtual disk so that the storage system can determine how to translate the requests to aligned offsets, it is desirable to hold off performing write requests to a persistent form of storage prior to detecting the MBR. Although, it is common for the MBR to be written around the time that the virtual disk is created, it is possible that the MBR may not be written before one or more write requests are sent to be processed at the virtual disk. Process 1200 may be used to prevent performing unaligned write requests at persistent storage (e.g., disk storage) until the MBR is located so that misalignment information can be determined and then used to translate the write requests to hopefully align them with boundaries of physical blocks.

At 1202, one or more received write requests are buffered. In some embodiments, write requests to a virtual disk whose MBR has not yet been located are buffered. For example, the data to be written associated with requests can be stored in memory or some other form of temporary storage. In some embodiments, meta data associated with each virtual disk is maintained such that buffered write requests are kept track of until they can be performed. In some embodiments, there is a configured size threshold associated with the received write requests such that only write requests whose sizes that meet or exceed the size threshold are buffered while write requests whose sizes do not meet the size threshold are written to persistent storage without buffering. One benefit to configuring a size threshold for buffering write requests is to hold off performing only write requests that are relatively bigger while permitting smaller write requests to proceed so that fewer than all write requests to the virtual disk are delayed due to buffering.

At 1204, it is determined whether the MBR is found. In some embodiments, the MBR can be detected in a portion of the virtual disk known to be the location at which the MBR is written. In some embodiments, meta data associated with the virtual disk includes a state associated with locating the MBR. If the state indicates that the MBR has not yet been found (e.g., because the MBR has not yet been written), then control passes back to 1202, where subsequent received write requests are buffered. However, if the state indicates that the MBR has already been found, then control passes to 1206.

At 1206, the MBR is read to determine a misalignment correction amount associated with each of one or more partitions. In some embodiments, the MBR or specifically, the partition table thereof is read to determine boundaries of the one or more partitions of the virtual disk. Then a misalignment correction amount can be determined for each partition based on, for example, using the techniques described with FIGS. 6A, 6B, 6C, and 6D.

At 1208, misalignment correction is applied to an offset associated with each of the one or more buffered write requests. Once the misalignment correction amount is determined for each partition, then misalignment translation is applied to each of the one or more buffered write requests such that a misaligned underlying offset of a write request is translated/adjusted by the misalignment correction amount associated the appropriate partition so that the adjusted underlying offset of the write request likely becomes aligned with a physical block.

At 1210, each of the one or more buffered write requests is performed based at least in part on the misalignment correction applied to the offset associated with the request. Each of the one or more buffered write requests are then performed at the corresponding adjusted underlying offset.

Figure 13:
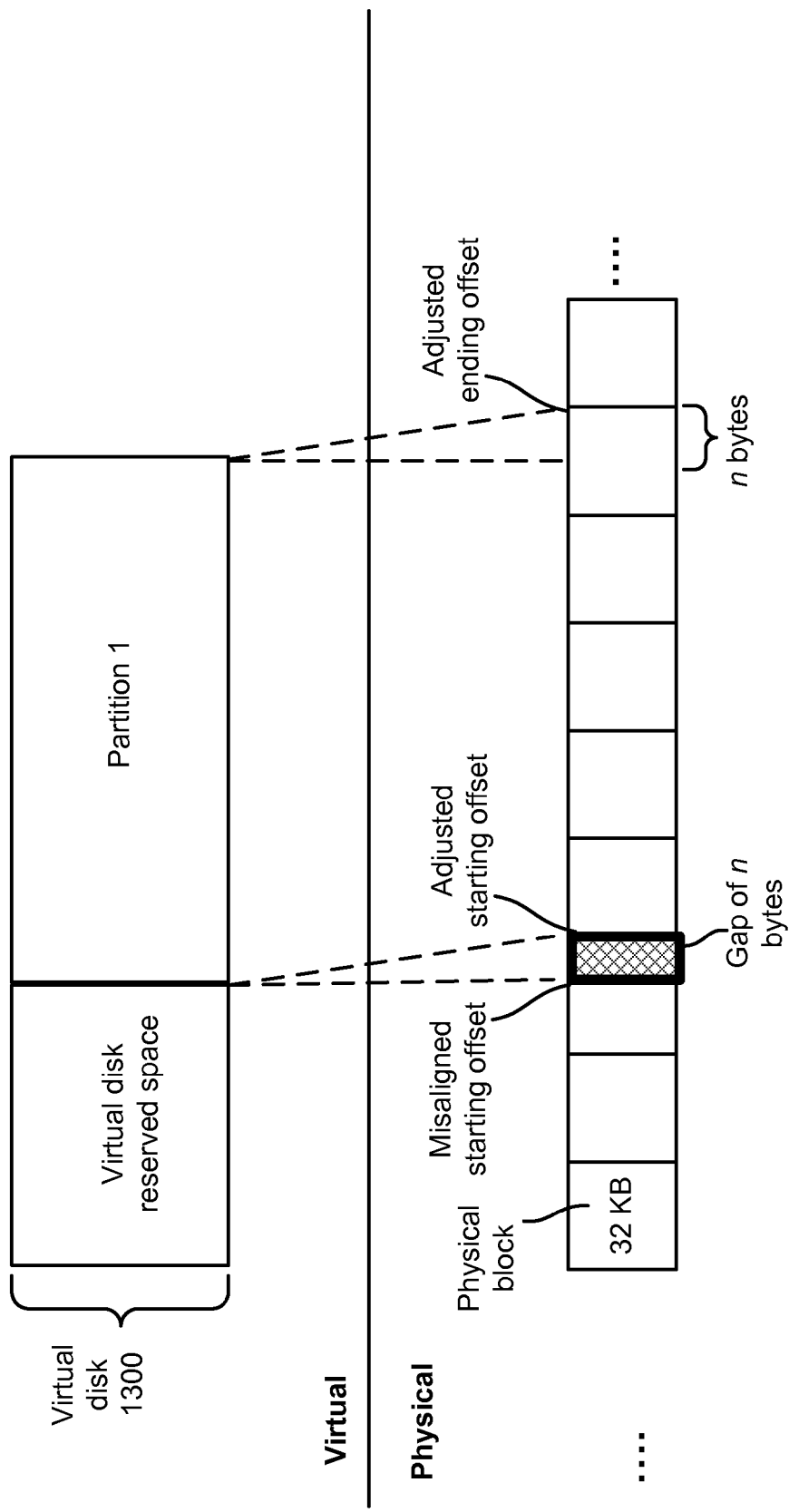
FIG. 13 is a diagram showing a gap created between a virtual disk reserved space and a partition associated with the lowest underlying offset of a virtual disk due to the application of misalignment translation.

FIG. 13 is a diagram showing a gap created between a virtual disk reserved space and a partition associated with the lowest underlying offset of a virtual disk due to the application of misalignment translation. In the example, for virtual disk 1300, a gap of n bytes (i.e., the misalignment correction amount) in the physical storage subsystem is created between the original misaligned offset of the partition associated with the lowest underlying offset ("Partition 1") and the adjusted starting offset of Partition 1, which is aligned with a starting boundary offset at a physical block. While a gap is depicted to be between the virtual disk reserved space and a partition with the lowest underlying offset of the virtual disk, a gap can also exist between two partitions. Because both the starting offset and the ending offset of Partition 1, in some embodiments, are adjusted by the n bytes of the misalignment correction amount and the virtual disk is not able to access this gap of n bytes, the amount of physical storage address space required for adjusted Partition 1 is effectively extended or increased by the size of the gap of n bytes. For example, if Partition 1 is 1 GB in size, then after performing misalignment correction, the physical storage to store data associated with Partition 1 could be 1 GB plus n bytes in addressable space, in some embodiments. Gaps such as these generally do not have negative consequences. However, instead of extending the physical storage required to store data associated with the virtual disk blocks at the end of the partition by n bytes, in some embodiments, n bytes of data from the end of the partition can be mapped to the gap. In some embodiments, mapping the data associated with an end of a partition or the end of an entire virtual disk to one or more gaps associated with the virtual disk is referred to as "wrapping back." In various embodiments, wrapping back the data results in data that would have otherwise been stored at or read from an offset associated with the end of a partition to being stored at or read from an offset associated with a gap associated with the partition.

Figure 14:
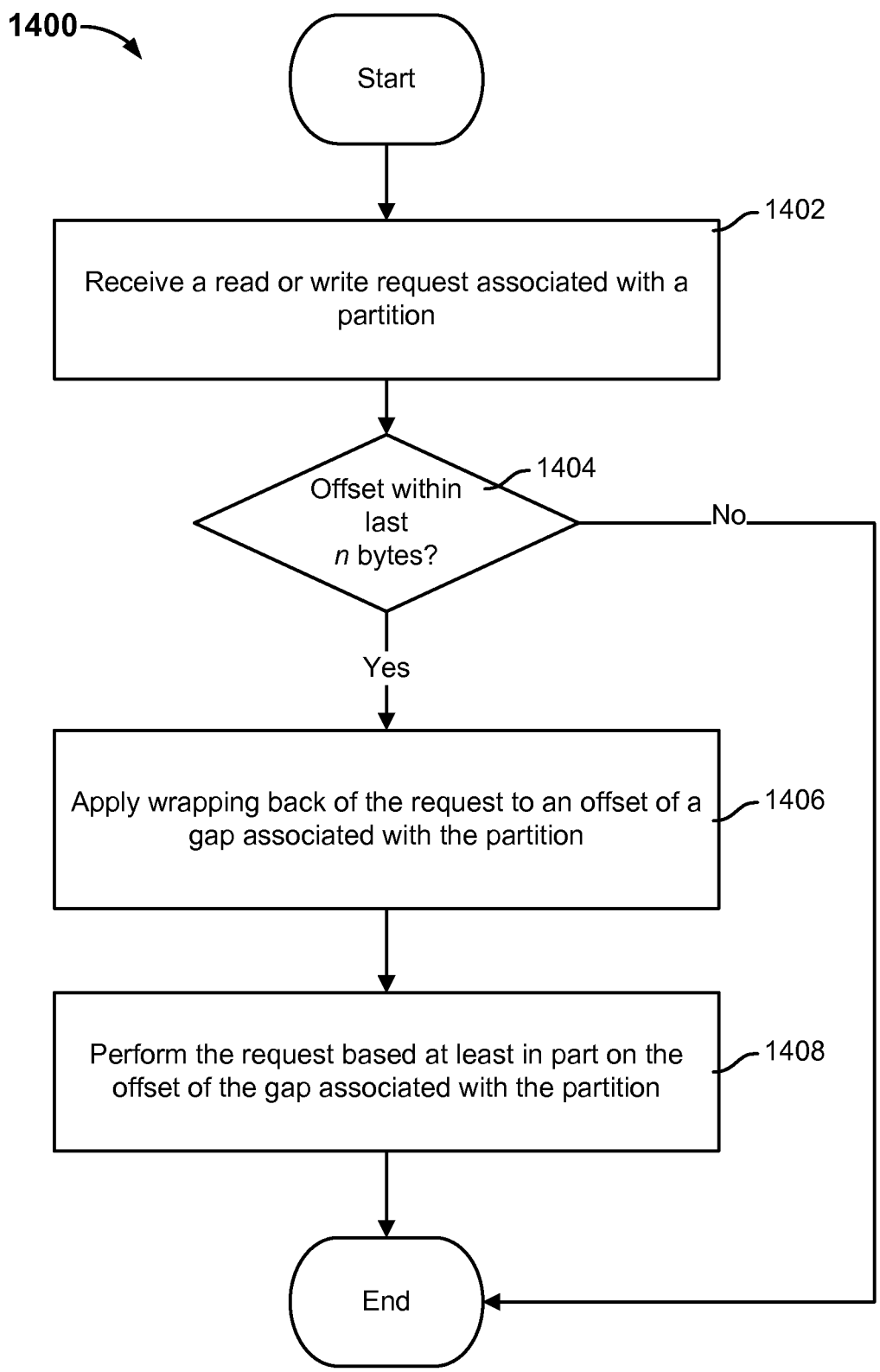
FIG. 14 is a flow diagram showing an embodiment of a process for wrapping back data associated with an end of a partition of a virtual disk.

FIG. 14 is a flow diagram showing an embodiment of a process for wrapping back data associated with an end of a partition of a virtual disk. In some embodiments, process 1400 is implemented at system 300.

In process 1400, it is assumed a gap of size n bytes located between the misaligned starting offset and the adjusted starting offset of the partition exists in the physical storage subsystem. As such, process 1400 allows requested data associated with the last n bytes of the partition to be wrapped back to the gap of n bytes (e.g., instead of mapping the last n bytes of the partition to an extended n bytes of physical storage to be associated with the partition). In this way, the gap created by the misalignment translation at the beginning of the partition can be filled in by the data associated with the end of the partition.

At 1402, a read or write request associated with a partition is received. In some embodiments, the read or write request includes at least an identifier of the VM with which the virtual disk is associated, an identifier of the partition within the virtual disk to which the request is to be performed, and also one or more virtual disk blocks in the partition at which data is to be written to or read from.

At 1404, it is determined whether an offset associated with the request is associated with the last n bytes of the partition. It is determined whether the one or more virtual disk blocks identified in the request corresponds to the last n bytes of the partition. In the event that the request is not associated with the last n bytes of the partition, then process 1400 ends (and the request is processed without applying wrapping back). In the event that the request is associated with the last n bytes of the partition, then control passes to 1406.

At 1406, wrapping back of the request to an offset of a gap associated with the partition is applied. In some embodiments, a starting offset of the gap (i.e., the original misaligned offset of the partition) is stored and data associated with the last n bytes are stored to and or read from the starting offset of the gap. In some embodiments, translating the offset associated with the last n bytes to the starting offset of the gap is performed transparently to the hypervisor.

At 1408, the request is performed based at least in part on the offset of the gap associated with the partition. The requested read or write operation is performed at the starting offset of the gap, instead of at an offset associated with an extended portion of the physical storage to be required for the partition.

In various embodiments, the same wrapping technique can be applied to an entire virtual disk rather than to an individual partition, although in this case, data that would extend the size of the physical storage to be required for the virtual disk beyond the original size of the virtual disk would be spread across multiple gaps rather than just one.

Figure 15:
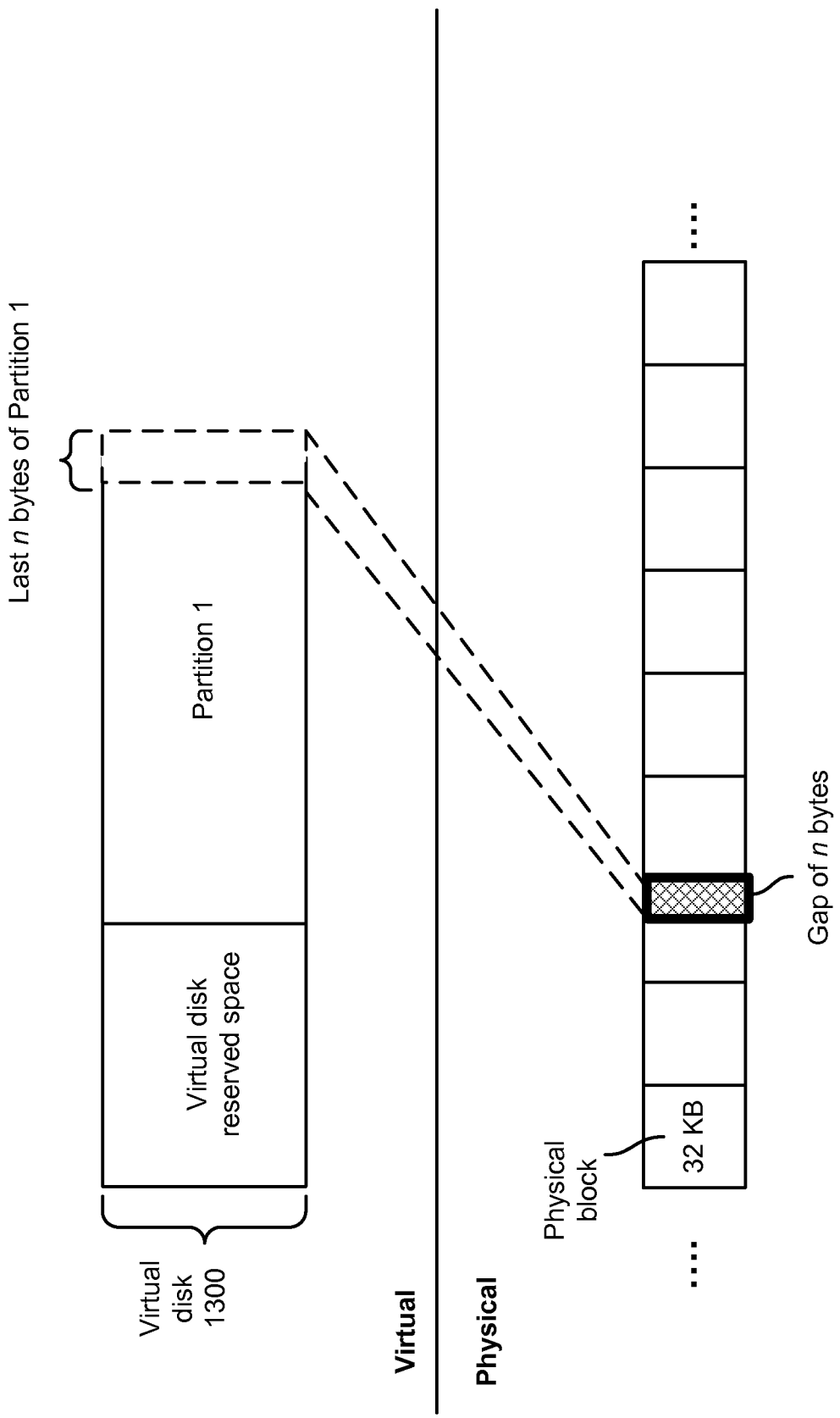
FIG. 15 is a diagram showing an example of the wrapping back of the last n bytes of a partition to a gap of n bytes of physical storage associated with the partition.

FIG. 15 is a diagram showing an example of the wrapping back of the last n bytes of a partition to a gap of n bytes of physical storage associated with the partition. Assume that if process 1400 were performed on the example, requested data associated with the last n bytes of Partition 1 would be wrapped back to the gap of n bytes that is located between the misaligned starting offset and the adjusted starting offset of Partition 1 in the physical storage subsystem.

For example, assume that the misaligned starting offset of Partition 1 was at 32,256 bytes and the adjusted starting offset of Partition 1 is at 32,768 and so the created gap is 512 bytes in size. In some embodiments, instead of extending the end of Partition 1 by 512 bytes, the last 512 bytes of Partition 1 can be mapped to (e.g., stored at or read from) underlying offset 32,256.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      extract data written to a logical container; and
      determine a starting offset for a partition associated with the logical container based at least in part on a misalignment correction amount associated with a previous partition and on the extracted data; and
   a memory coupled to the processor and configured to store the starting offset.

2. The system of claim 1, wherein data written to the logical container comprises a master boot record (MBR).

3. The system of claim 2, wherein the processor is further configured to detect the MBR based on one or both of the following: monitoring a location to which the MBR is to be written and detecting one or more data patterns associated with the MBR.

4. The system of claim 2, wherein the processor is further configured to determine whether the MBR has been detected:
   in the event that the MBR has not been detected, buffer a received write request until the MBR has been detected; and
   in the event that the MBR has been detected, perform the write request and any buffered write requests by at least automatically translating an offset associated with each write request by at least a misalignment correction amount determined for a partition associated with that write request.

5. The system of claim 4, wherein to buffer the write request includes to store data associated with the write request in temporary storage.

6. The system of claim 4, wherein in the event that the MBR has been detected, the processor is further configured to move any unaligned data written prior to detecting the MBR based at least in part on any associated misalignment correction amounts.

7. The system of claim 1, wherein the data written to the logical container associated with boundaries of one or more partitions associated with the logical container comprises a partition table.

8. The system of claim 7, wherein to determine the starting offset for the partition associated with the logical container is based at least in part on reading the partition table.

9. The system of claim 1, wherein the processor is further configured to use the starting offset of the partition to determine a misalignment correction amount for the partition.

10. The system of claim 9, wherein the partition comprises a first partition and wherein the processor is further configured to determine a misalignment correction amount for a second partition associated with the logical container based at least in part on the misalignment correction amount determined for the first partition.

11. The system of claim 9, wherein the processor is further configured to:
   receive a request associated with the partition; and
   automatically translate an offset associated with the request by an amount determined based at least in part on the misalignment correction amount for the partition.

12. The system of claim 11, wherein to translate the offset associated with the request is performed transparent to an associated hypervisor.

13. The system of claim 11, wherein the partition comprises a first partition and wherein the processor is further configured to translate a misalignment correction amount for a second partition included in the logical container based at least in part on the misalignment correction amount for the first partition.

14. The system of claim 11, wherein the processor is further configured to perform the request at an offset determined based at least in part on the translation of the offset of the request by at least the misalignment correction amount for the partition.

15. The system of claim 11, wherein the processor is further configured to:
   determine whether the request is associated with a configured amount of storage associated with an end of the partition; and
   in the event that the request is associated with the configured amount of storage associated with the end of the partition, apply wrapping back of the request to an offset associated with a gap of the partition.

16. The system of claim 1, wherein the starting offset for the partition is determined based at least in part on statistical information derived from historical misalignment information.

17. The system of claim 1, wherein determining the starting offset based at least in part on a misalignment correction amount associated with a previous partition and on the extracted data comprises:
   computing the starting offset using the misalignment correction amount applied to the previous partition and an additional adjustment necessary to shift a starting boundary of the partition with the misalignment correction amount applied to a next starting boundary of a physical block.

18. A method, comprising:
   extracting data written to a logical container; and
   determining a starting offset for a partition associated with the logical container based at least in part on a misalignment correction amount associated with a previous partition and on the extracted data.

19. The method of claim 18, wherein data written to the logical container comprises a master boot record (MBR).

20. The method of claim 19, further comprising detecting the MBR based on one or both of the following: monitoring a disk location to which the MBR is to be written and detecting one or more data patterns associated with the MBR.

21. The method of claim 19, further comprising determining whether the MBR has been detected:
   in the event that the MBR has not been detected, buffering a received write request until the MBR has been detected; and
   in the event that the MBR has been detected, performing the write request and any buffered write requests by at least automatically translating an offset associated with each write request by at least a misalignment correction amount determined for a partition associated with that write request.

22. The method of claim 18, wherein the data written to the logical container associated with boundaries of one or more partitions associated with the logical container comprises a partition table.

23. The method of claim 22, wherein determining the starting offset for the partition associated with the logical container is based at least in part on reading the partition table.

24. A computer program product, the computer program product being embodied in a non-transitory computer readable storage medium and comprising computer instructions for:

extracting data written to a logical container; and determining a starting offset for a partition associated with the logical container based at least in part on a misalignment correction amount associated with a previous partition and on the extracted data.

\* \* \* \* \*